US012626018B2

(12) United States Patent
Ramsay et al.

(10) Patent No.: US 12,626,018 B2
(45) Date of Patent: May 12, 2026

(54) DATA TRANSMISSION

(71) Applicant: CYACOMB LIMITED, Edinburgh (GB)

(72) Inventors: Bruce Ramsay, Edinburgh (GB); Ian Stevenson, Edinburgh (GB)

(73) Assignee: CYACOMB LIMITED, Edinburgh (GB)

( * ) Notice: Subject to any disclaimer, the term of this patent is extended or adjusted under 35 U.S.C. 154(b) by 95 days.

(21) Appl. No.: 18/563,167

(22) PCT Filed: May 20, 2022

(86) PCT No.: PCT/GB2022/051289
§ 371 (c)(1),
(2) Date: Nov. 21, 2023

(87) PCT Pub. No.: WO2022/243707
PCT Pub. Date: Nov. 24, 2022

(65) Prior Publication Data
US 2024/0232434 A1      Jul. 11, 2024

(30) Foreign Application Priority Data
May 21, 2021    (GB) ..................................... 2107332

(51) Int. Cl.
*G06F 21/62*          (2013.01)
*G06F 16/432*         (2019.01)
(Continued)

(52) U.S. Cl.
CPC ........ *G06F 21/6263* (2013.01); *G06F 16/432* (2019.01); *G06F 21/602* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 10,635,824 B1 * | 4/2020 | Triandopoulos | ...... | G06F 21/602 |
| 10,970,393 B1 * | 4/2021 | Stiles | .................... | G06F 21/554 |
| 2017/0195365 A1 * | 7/2017 | Basson | .................... | H04L 63/20 |

FOREIGN PATENT DOCUMENTS

WO          2017115168 A1      7/2017

OTHER PUBLICATIONS

Written Opinion for Application No. PCT/GB2022/051289 dated Nov. 24, 2022, 8 pp.

(Continued)

*Primary Examiner* — Brandon Hoffman
(74) *Attorney, Agent, or Firm* — CANTOR COLBURN LLP

(57)          ABSTRACT

A method and computer system for submitting and receiving data relating to a first digital content element. A search query comprising at least a portion of a first digital content element is derived at a first entity, the search query being based on a first number of possible search results in a set of search results. The search query is transmitted to a second entity which comprises a content database, the content database comprising a plurality of digital content elements. A set of search results is obtained based on the search query, the set of search results comprising any digital content elements of the content database matching the search query. The search results may be transmitted to the first entity and Matched with the first digital content element or it may be transmitted to a third entity which may be a law enforcement organisation.

27 Claims, 15 Drawing Sheets

(51) Int. Cl.
    *G06F 21/60*       (2013.01)
    *H04L 9/40*       (2022.01)

(56)           References Cited

OTHER PUBLICATIONS

International Search Report for PCT/GB2022/051289 mailed Nov. 8, 2022, 2 pp.

* cited by examiner

DATA TRANSMISSION

CROSS REFERENCE TO RELATED APPLICATIONS

This application is a 35 U.S.C. § 371 U.S. national phase entry of International Application PCT/GB2022/051289, filed May 20, 2022, which claims priority to GB 2107332.5, filed May 21, 2021, the contents of each of which are incorporated by reference in their entirety herein for all purposes.

FIELD OF THE INVENTION

This invention relates to data transmission between devices connected to a communication network and particularly, but not exclusively, improving security of communications between devices connected to such a network.

BACKGROUND TO THE INVENTION

Maintaining privacy and security of communications transmitted between devices (e.g., user devices or server devices) connected to a communication network (such as the internet) has a number of requirements.

A first requirement is that the content of the communications is encrypted to a sufficient degree. This is often referred to as content privacy. Generally, it can be assumed that contemporary encryption, when properly implemented, is sufficient to protect the content from the majority of malicious third parties. However, a malicious third party with sufficient resources may be able to break encryption of a particular communication and gain access to the contents thereof.

A second requirement is that the end point devices are secure. If a bad actor has access (e.g., by hacking, malware or stealing an unlocked device) to either of the end point devices, maintaining privacy of the communications is impossible.

In general, a well-designed encrypted messaging application, that is used to exchange data communications between two reasonably secured end point devices, will offer a high degree of assurance of privacy of the content of messaging.

However, the fact that data communications are being exchanged is far less private. This is often referred to as traffic privacy. Further, information about the end points of such exchanges is typically not private. As an example, for any devices that are connected to a network (e.g., the internet) and use the network for data communications, it is likely that one or more third parties (e.g., Internet Service Providers, or operators of intermediary networks) know the identity of the user or devices involved in the data communication. Additionally, messages that are transmitted by way of a network must contain a destination address that can be used by the network to ensure that it is passed to the correct destination. Such information can be extracted by suitably equipped third parties.

A malicious third party with access to such network information may be able to make inferences about the messages as well as the content. For example, it may be possible for such a malicious third party to infer the identities of the parties exchanging the communications, the types of applications or platforms being used, the timing, volume and size of the communications. The volume and size of the communications may, for example, indicate the content of the communications (e.g., whether it is text, images or video). The malicious third party may further correlate this obtained information with other data (e.g., data held by an ISP relating to the identities of users, or data gathered by advertising networks).

Accordingly, even if a malicious third party cannot access or determine the identity of a particular digital content element (e.g., without limitation, a data or media file, a representation or hash of a data or media file, or another relevant data element or structure), it may be possible to determine one or more of: the origin of the digital content; the movement of the digital content element across a network; the identity of any entities or users involved; or information relating to the content of the digital content element. In some circumstances, even such information may be sufficient for a malicious third party to cause damage or harm. For example, if the digital content element is a potentially illegal media file, it may be sufficient that a malicious third party can determine the identities of any users that have been in contact with it as well as the origin of the file.

Further, privacy of data communications is particularly important in cases where the content of such communications may potentially relate to illegal, unlawful, immoral or otherwise confidential content.

For example, it may be necessary or advantageous to determine whether a data communication potentially relates to illegal or unlawful content prior to transmission of the data communication (e.g., if the operator of a social media platform wishes to determine whether a user of said platform is intending to share illegal content). However, in order to perform such a check, it may be necessary to transmit at least a portion of the data communication by way of a network, which may potentially cause breach of privacy and/or cause potentially illegal content to be transmitted by way of the network. In some circumstances, transmission of such content may be highly disadvantageous or illegal (due, in part, to the risk that malicious third parties may intercept the communication).

An example of an intervention which severely compromises user privacy would be a scheme whereby content to be shared by the user in the messaging app was first uploaded to a cloud service to be checked. In this case, the content of the message is supplied to a cloud service, and while an encrypted link may be used, the data must be in processable (unencrypted) form at the cloud service. Content privacy in this situation is dependent on the user trusting the cloud service and on the level of cybersecurity and human security measures used by the service.

Transmitting a hash of user content to a cloud service for checking has similar problems, in that the hash may be revealed. For some content (e.g. a photo the user has just taken themselves) the risk that the hash could be revealed by/to a bad actor is of little consequence, although even in this scenario a new type of privacy risk appears.

While the hash may be meaningless, it will always be consistent for a given piece of content, so a leaking of hashes could allow definitive tracking of content as it moved between users. If that image later becomes public (or known to authorities) the content could retrospectively be traced to everyone who accessed or exchanged the image. Content trackability is not as dangerous as content leaking but is still a serious risk to privacy.

Privacy breaches include:
a Content Breach, where content is revealed directly to a bad actor;

a Matching Breach where content exchanged can be determined with a high degree of confidence (e.g. via hash lookup);

a Traffic Breach where the content is not revealed but the fact parties have been communicating is revealed;

a Tracking Breach, where a bad actor is able to track items of content as they pass from user to user usually through metadata; and a Negative Matching Breach where a bad actor is provided with a degree of confidence that the content of a message doesn't match items in a database, or an item in another message.

The inventors of the present invention have appreciated the shortcomings with known systems.

SUMMARY OF THE INVENTION

In accordance with a first aspect of the invention, there is provided a method for submitting and receiving data relating to a first digital content element, comprising:

deriving a search query at a first entity, the search query comprising at least a portion of a first digital content element, wherein the search query is derived based on a first number of possible search results in a set of search results;

transmitting the search query to a second entity, the second entity comprising a content database, the content database comprising a plurality of digital content elements;

deriving a set of search results based on the search query, the set of search results comprising any digital content elements of the content database matching the search query;

transmitting the set of search results to the first entity; and matching the set of search results with the first digital content element.

In accordance with a second aspect of the invention, there is provided a method for submitting and receiving data relating to a first digital content element, comprising:

deriving a search query at a first entity, the search query comprising at least a portion of a first digital content element, wherein the search query is derived based on a first number of possible search results in a set of search results;

transmitting the search query to a second entity, the second entity comprising a content database, the content database comprising a plurality of digital content elements;

deriving a set of search results based on the search query, the set of search results comprising any digital content elements of the content database matching the search query;

wherein the second entity matches the set of search results with the first digital content element; and upon detecting matching content, the second entity takes one or more actions in response.

The first digital content element may comprise a representation of at least a portion of an original digital content element. The first digital content element may comprise a plurality of representations of portions of the original digital content element. The first digital content element may comprise one of: a hash; a similarity hash; or other calculated fingerprint or identifier.

Further processing may be applied to the hash or similarity hash. The further processing may comprises further hashing or encryption.

Data including seeds/salts/keys may be used to parameterise these computations and either known as a shared secret or provided by the server The step of deriving a search query may comprise:

selecting at least a first portion of the first digital content element; and establishing the search query based on the selected first portion.

The step of deriving a search query may comprise:

selecting a plurality of first portions of the first digital content element; and establishing the search query based on at least one of the selected first portions.

The step of deriving a search query may further comprise: determining a total number of sub-elements comprised in the first digital content element.

The step of selecting at least a first portion of the first digital content element may comprise:

deriving at least one set of representation units from at least a first portion of the first digital content element, wherein the at least one set of representation units comprises one or more representation units; and selecting at least one of the one or more sets of representation units.

The first portion may comprise at least one sub-element of the first digital content element. The first portion may comprise a plurality of sub-elements of the first digital content element. The at least one sub-element may be a block.

The step of deriving at least one set of representation units may comprise deriving a plurality of sets of representation units from the at least one first portion of the first digital content element. The step of deriving at least one set of representation units may comprise subtracting a randomised value from each of the at least one set of representation units.

The method as set out above may further comprise dividing the first digital content element into a plurality of sub-elements, each of which comprises one or more information units.

The step of deriving at least one set of representation units may comprise deriving at least one most significant bit from the at least one first portion. The step of deriving at least one set of representation units may comprise deriving a plurality of most significant bits from the at least one first portion.

The step of establishing the search query may further comprise:

generating at least one additional sets of randomised representation units; and including the at least one additional sets of randomised representation units in the search query.

The method as set out above may further comprise creating a first digital content element based on at least a portion of an original digital content element. The step of creating a first digital content element may further comprise:

transmitting an initial request message from the first entity to the second entity, the initial request message comprising a request for at least a first required characteristic;

receiving an initial response message from the second entity at the first entity, the initial response message comprising at least a first required characteristic; and generating the first digital content element based on the at least first required characteristic.

The at least first required characteristic may comprise one or more of: a minimum size for each of the at least one sets of representation units to guarantee that any set of representation units comprised in the search query will result in at least one positive and one negative result; a required hashing or representation methodology to be used for the search query; or a number of sets of representation units required.

The action in response may comprise reporting the match to a third entity, where the third entity may be a law enforcement organisation or other entity with an interest in receiving information concerning matching content.

The action in response may comprise accumulating a risk score for a user or a group associated with sending or receiving a message containing the matching content.

The action in response may comprise blocking the user from the platform wherein the user is associated with sending or receiving a message containing the matching content.

The action in response may comprise returning information to the first entity which results in one or more actions including transmission of the content being blocked, triggering a report to a moderation team, displaying a warning message or prompt to the user.

In accordance with a third aspect of the present invention, there is provided a computer program product containing one or more sequences of machine-readable instructions for implementing a method as set out above.

In accordance with a fourth aspect of the present invention, there is provided a computer system operable to carry out the method as set out above. The computer system may comprise:

a first device operable to carry out at least a first portion of the method steps as set out above; and a second device operable to carry out at least the remaining of the method steps as set out above.

BRIEF DESCRIPTION OF THE DRAWINGS

An embodiment of the invention will now be described, by way of example, with reference to the drawings, in which.

DESCRIPTION OF THE PREFERRED EMBODIMENTS

Figure 1:
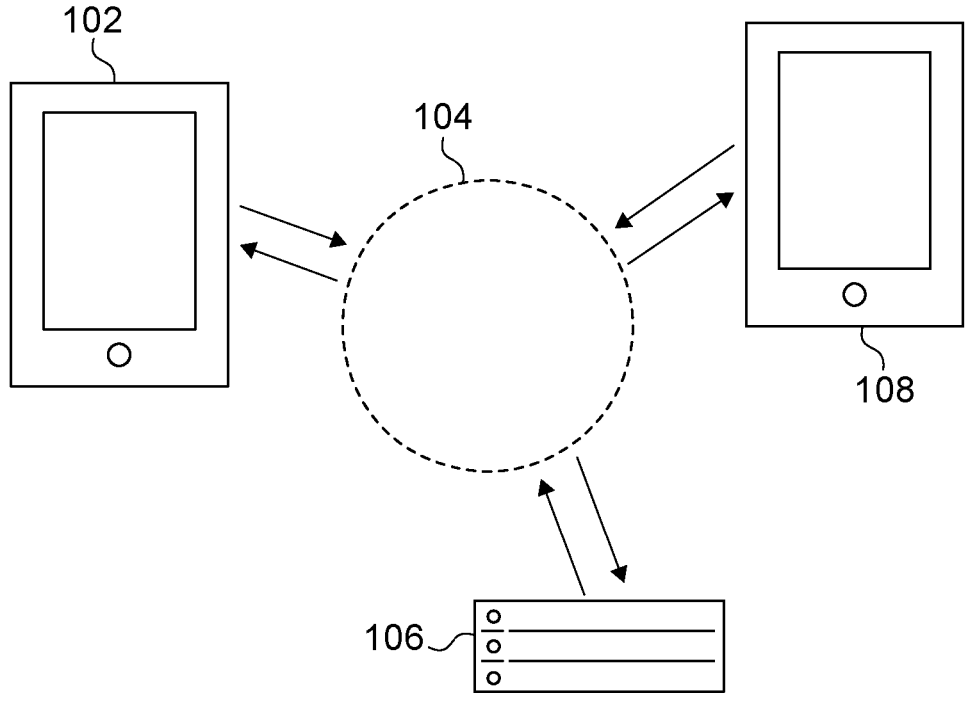
FIG. 1 illustrates an exemplary system in which the embodiments of the invention may be implemented.

The method and computer system of the present invention may be used to help law enforcement, social media and cloud companies find and block harmful content.

The technology can even be used on mobile devices, without sending images or video to the cloud for analysis. This unique capability makes it suitable for detecting and blocking harmful content in end-to-end encrypted messaging apps an area where there are no other effective solutions.

Before describing the exemplary embodiments of the invention, it may be illustrative to describe an exemplary environment in which the exemplary embodiments may be implemented. It will, of course, be appreciated that the following environment is exemplary only, and not intended to be limiting. Other environments, comprising alternative or additional components, may easily be envisaged.

An exemplary system in which the embodiments of the present invention may be implemented will now be discussed with reference to FIG. 1.

A user device 102 is connected to a communications network 104. The user device interacts with the communications network in a suitable manner. The user device may be any suitable user device, such as a mobile telephone, a tablet device, a laptop computer or a desktop computer. Further, the user device may in some examples act as a server for other devices connected to it by way of a network (e.g., the communications network 104). Hence, it will be appreciated that the term 'user device' is used purely for exemplary purposes and for ease of explanation.

The communications network may use any suitable technology or methodology to enable communications between user devices and servers connected thereto. The communications network may (without limitation) use one of: 4G; 5G; Ethernet; Wi-Fi; Broadband or Bluetooth.

A remote device 106 is connected to the communications network. The remote device communicates with other devices by way of the communications network in a suitable manner. The remote device may be any suitable device, such as a mobile telephone, a tablet device, a laptop computer, a desktop computer, a cloud hosting service or a server device.

Also connected to the communications network is a second user device 108. The second user device interacts with the communications network in a suitable manner. The second user device may be any suitable user device, such as a mobile telephone, a tablet device, a laptop computer or a desktop computer.

It should be noted that, whilst only a single communications network 104 is shown in FIG. 1, some or all of the user device 102, remote device 106, or second user device 108 may be connected to additional communications networks. For example, it is possible for a particular device to be connected to a 4G or 5G communications network as well as being connected to a Wi-Fi network.

During normal operations, the user device 102 may communicate with either or both the remote device 106 or second user device 108 by way of the communication network. For example, the user device may make one or more data requests for one or more digital content elements stored on the remote device. The one or more digital content elements may be stored on the remote device permanently or may be stored temporarily (e.g., for processing purposes). In response to a data request, the remote device may transmit any relevant digital content elements to the user device. In other examples, the user device exchanges communications with the second user device. In a specific example, the user device and the second user device are communicating by way of an encrypted messaging application, and the remote device is a server device.

Typically, communications are encrypted so as to prevent unauthorised parties from accessing the contents of the communications. As is well known, and as described above, it is sometimes possible for malicious third parties to break encryption or otherwise access the content of a particular communication.

Further, as discussed above, even if an unauthorised third party cannot immediately access the contents of any communications transmitted between the user device and the remote device, it is still possible to determine the presence of the communications. Further, it may be possible to infer information regarding the communications (e.g., file sizes, file types, date stamps and information relating to the end points).

Additionally, if any communications between the user device and the remote device are intercepted by an unauthorised third party, it is possible that the third party may be able to break any encryption or other security features to access the contents of the communication. In this manner, the unauthorised third party may gain access to either or both of the data request or the corresponding digital content elements. Even if the encryption cannot be broken, the third party may subsequently be able to determine the content of the communication with a high degree of confidence.

Further, the contents of any communications (e.g., data requests) sent to the remote device will be known by the remote device. As an example, if the user device sends a search query for a specific digital content element that may be stored on the remote device, the result of the search query will be known to the remote device. Hence, if an unauthorised third party was to gain access to the remote device (for example if the server is hacked), the third party would also obtain knowledge about any search queries and their results made by any user devices.

Yet further, an unauthorised or malicious third party may be able to track movement of a digital content element between multiple users, entities and/or devices. Further, the third party may be able to determine information relating to the devices, applications and/or users themselves.

It will be appreciated, based on the above, that it is not necessary for a malicious third party to gain direct access to the content of a communication in order to determine the identity of said content. For example, if a communication contains an image or other file, it may not be necessary for the malicious third party to gain access to the image or file in its entirety in order to determine the identity of the image or file.

If a malicious party obtains access to a portion of a file (e.g., a data communication containing the portion of the file), it may in some circumstances be possible to narrow down the number of possible files that could match the obtained portion. If the number of possible matches is sufficiently small, the malicious party may be able to determine (for example with the use of additional evidence or information) the identity of the file in question.

It is possible to estimate the number of files that match a given portion of a file or representation of a file. Purely for illustrative purposes, it will be assumed that there exists an imaginary database of representations of files (e.g., file hashes), said representations representing all files that are accessible by any party. For purposes of the present example, it will be assumed that the imaginary database has a file count of $f=2^{100}$ files.

It will further be assumed that the malicious third party is in possession (e.g., through one of the types of attack described above) of n bits of a file hash, the file hash having a hash length of h bits.

The number of files in this imaginary database u which are potential matches for n bits from a hash in a system with a hash length of h bits and a file count of f can be given by $$\text{possible hashes} = 2^{h-n}$$

$$u = f * \frac{\text{possible hashes}}{2^h} = f * \frac{2^{h-n}}{2^h} = f * \frac{1}{2^n}$$

A value for u of 1 or less indicates that a file has been uniquely identified. Any value greater than 1 indicates the size of the list of files identified by that number of hash bits. This can be rearranged as:

$$u = f * \frac{1}{2^n} = 2^{\log_2 f} * \frac{1}{2^n} = \frac{2^{\log_2 f}}{2^n} = 2^{\log_2 f - n}$$

In the present example, the file count of the imaginary database is $f=2^{100}$, which reduces the equation to:

$$u = 2^{100-n}$$

As will be seen, if the number of bits in possession of the malicious third party is n=100 or more, a file will be uniquely identified. However, if the number of known bits falls below 100, the number of files that match the portion of the file hash increases.

High values of u indicate higher degrees of privacy (less certainty about which file is correct for a given number of bits transferred).

Hence, in order to ensure privacy as regards the identity of a file or file hash, it needs to be ensured that the lowest possible number of bits is included in the data communication. The lower the number of bits, the higher the number of potentially matching file hashes there will be, which reduces the risk that the malicious third party will be able to uniquely identify the file hash or file in question.

As will be discussed in more detail in the following, there are a number of ways to decrease the risk that a malicious third party is able to determine the identity of a particular file hash or file. Further, the exemplary methods that will be discussed in the following may also be employed to reduce the risk that a malicious third party is able to determine any other information relating to the file, including information relating to users, devices or applications that have been in contact therewith.

Figure 2:
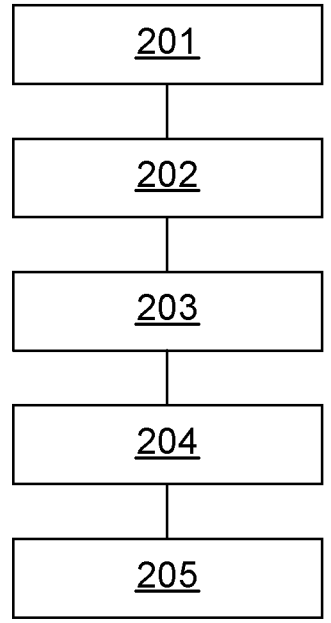
FIG. 2 shows a first embodiment of the present invention.
Figure 3:
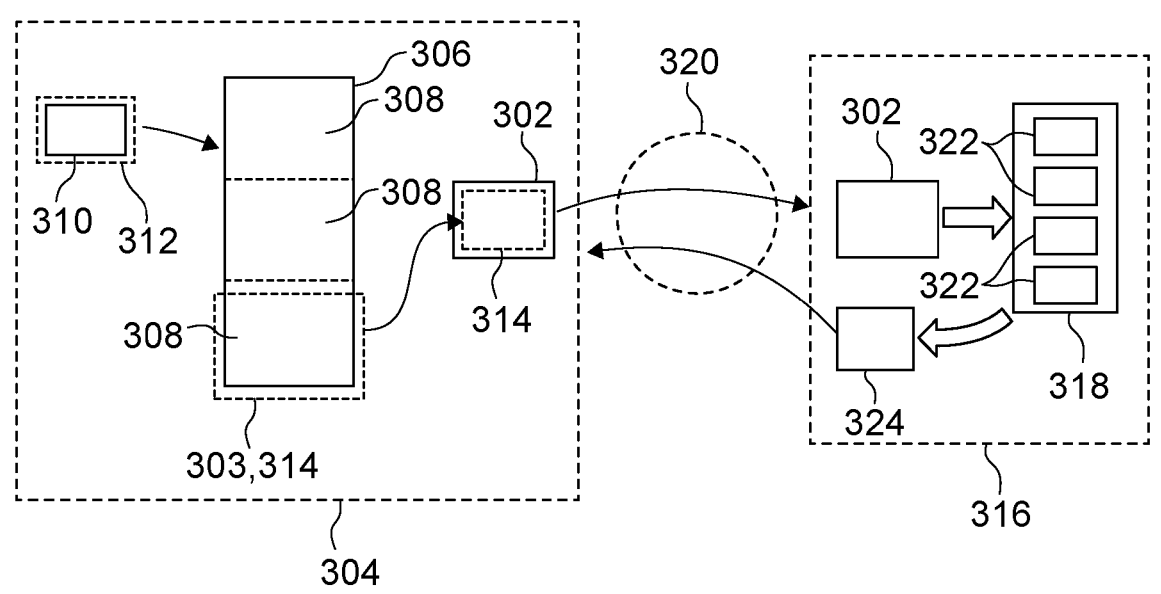
FIG. 3 illustrates schematically the embodiment of FIG. 2.

An exemplary implementation of the present invention, such as may be implemented in the system discussed with reference to FIG. 1, will now be discussed with reference to FIG. 2 and FIG. 3.

In a first step 201, a search query 302 is derived at a first entity 304, the search query comprising at least a portion 303 of a first digital content element 306. The derivation may be performed in any suitable manner. The search query is derived based on a first number of possible search results in a set of search results. In some examples, the search query is derived based on additional characteristics or parameters.

It will be appreciated that a number of implementations may be envisaged by the skilled person. A number of exemplary implementations will be discussed in more detail in the following sections.

The first digital content element 306 may comprise any suitable number of sub-elements 308, sections or blocks. In the following, reference will be made generally to sub-elements, although it will be understood that this is purely for descriptive purposes and not intended to be limiting. It will be appreciated that the sub-elements, sections or blocks may be defined by one or more of: the formatting and/or encoding of the digital content element; the properties or characteristics of one or more software applications used to perform operations on the first digital content element; properties or characteristics of the operating system of the computing system in which the first digital content element is created, operated on or stored; or the properties or characteristics of the computing system itself.

In some examples, the first digital content element 306 comprises a single sub-element 308. In some examples, the first digital content element comprises a plurality of sub-elements. Each sub-element in the plurality may have any suitable properties or characteristics. Each of the sub-elements in the plurality share one or more properties, such as (without limitation) size, encryption, encoding or formatting. In some examples, each of the sub-elements has a substantially identical size to each of the other sub-elements.

The first digital content element 306 may comprise any suitable content. In some examples, the first digital content element comprises one or more portions or elements of original digital content element 310. In other examples, the first digital content element comprises one or more portions or elements of a representation 312 of the original digital content element 310. In some examples, the first digital content element comprises one or more representations of at least a portion of the original digital content element 310. In some examples, the first digital content element comprises a combination of one or more portions or elements of an original digital content element and one or more portions or elements of a representation of an original digital content element (or parts thereof).

In examples wherein the first digital content element 306 comprises a representation of data, any suitable methodology or algorithm may be used to create the representation based on the original data. In some examples, the representation is created by using a hashing function. In some examples, the representation is created by using a plurality of hashing functions.

As discussed above, use of representations of data, rather than the data itself, is particularly relevant in circumstances wherein where the data comprises content that may potentially be unlawful, illegal or immoral. In such situations, it may be illegal for any party to possess, store or transmit such data, thereby necessitating that only representations of such data is used. In other circumstances, the data may relate to content that cannot, should not, or must not be shared with third parties. Due to the risk that the search query is intercepted during transmission, e.g., by unauthorised third parties, it may be desirable, required or advantageous to mitigate or remove these risks.

Purely by way of example, the first entity may be a user, and the first digital content element may be a media element that the user is intending to transmit from a user device belonging to the user. For example, the user may be intending to post an image that has been obtained by way of the user device to a social media account (or to a second user device owned or operated by a second user). The media element may potentially be of questionable legality or morality. In order to prevent that any illegal or immoral material is transmitted from the user device, it is desirable or advantageous to query whether the first digital content element contains any such illegal or immoral material. Specifically, in some examples, the query is transmitted to a second entity, wherein the second entity is a content database comprising a collection of known illegal or offensive material.

Further, as discussed above, it may be undesirable or disadvantageous for a second entity, the operator of a second entity, or an external third party to be able to determine whether a particular search query from the first entity results in a match. It is therefore necessary to reduce or minimise the likelihood that any inferences can be made as to the likelihood of a match being present in a set of search results.

Further, in some examples, the first digital content element is encoded or encrypted in a suitable manner. It will be appreciated that a number of suitable or relevant encodings or encryptions may be envisaged.

The search query 302 may comprise any suitable first portion 314 of the first digital content element 306. In an example, the search query comprises the entirety of the first digital content element. In some examples, the first portion comprises a selected number of discrete sections of the first digital content element. In an example, the first portion comprises one or more sub-elements of the first digital content element. In an example, the first portion comprises one or more portions of at least one of the at least one sub-element of the first digital content element.

Any suitable number of discrete portions or sub-elements may be selected. The number may be selected in any suitable or relevant manner. In an example, the selected number is predetermined. In an example, the selected number is selected by one of: a user; the user device; the server; or a controlling entity.

In some examples, the first portion 314 is determined based on one or more characteristics of or relating to the first digital content element 306. In some examples, the first portion is determined, selected and/or extracted as part of the step of deriving the search query. This will be discussed in more detail in the following.

In a second method step 202, the search query 302 is transmitted to a second entity 316, the second entity comprising a content database 318. The search query may be transmitted to the second entity in any suitable fashion. In some examples, the search query is transmitted by way of a communication network 320 (e.g., such as described with reference to FIG. 1).

The content database 318 may comprise any suitable or relevant stored digital content elements 322 that could be searched for or be of interest to a particular user or entity. In some examples, the content database comprises a plurality of stored digital content elements. In some examples, the content database comprises a plurality of representations of digital content elements or other data of interest. By only storing a representation of the data of interest or relevance, it may be prevented that this data is accessed by any unauthorised third parties (during storage in the content database or transmission to and from the content database).

This is particularly relevant in situations where the stored digital content elements 322 in the content database 318 contain proprietary and/or potentially illegal subject matter. Purely by way of example, the content database may comprise illegal or banned material stored by a relevant authority (such as a law enforcement agency) for investigative or law enforcement purposes. Since it may be highly undesirable or illegal to even make such material available for searching, it may be necessary to store a representation of the material that allows it to be searched but does not allow the restoration of the original material.

Additionally or alternatively, it may be highly disadvantageous or illegal for the stored digital content elements 322 to be accessed or accessible by third parties. Examples of the latter include circumstances wherein the data is of importance to the owner, e.g., proprietary data, financial data or other such data. In such situations, the proprietor of the data may be severely negatively influenced by any unauthorised access by such third parties.

In some examples, the plurality of stored digital content elements 322 are encoded or encrypted in a suitable manner. It will be appreciated that a number of implementations may be envisaged within the present disclosure.

In a third method step 203, a set of search results 324 is derived based on the search query 302, the set of search results comprising a second number of retrieved datasets of the database. The set of search results may be derived in any suitable fashion.

It will be appreciated that the derivation step is dependent on the properties of one or more of the first digital content element 306, the content database 318, or the plurality of stored digital content elements 322 stored in the content database 318.

In a fourth method step 204, the set of search results 324 is transmitted to the first entity 304. The set of search results may be transmitted in any suitable fashion.

In some examples, the set of search results is transmitted to the first entity by way of a communication network such as is discussed with reference to FIG. 1 above.

In a fifth method step 205, the set of search results 324 is matched with the first digital content element 306. The matching step may be performed in any suitable fashion and using any suitable number of sub-steps. In some examples, the matching step comprises determining whether the digital content element is present in the set of search results.

In the above example, reference is made to first and second entities generally. It will be appreciated that, whilst the first entity may typically be a client or user device and the second entity may be a server or remote device, this is only an example. In principle, the first entity could equally well be a server or other non-user device. Purely by way of example, the first entity could be a server-based application, such as a secure photography storage service, that wishes to be able to check that it is not hosting illegal or immoral content without violating the privacy of the users of the storage service.

It will be appreciated that the above-described method is merely exemplary and that numerous variations thereof may be envisaged by the skilled person within the scope of the present disclosure.

Figure 4:
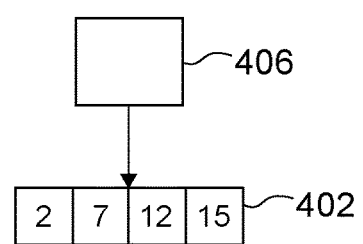
FIG. 4 and FIG. 5 show an illustrative conceptual example of a search methodology.
Figure 4:
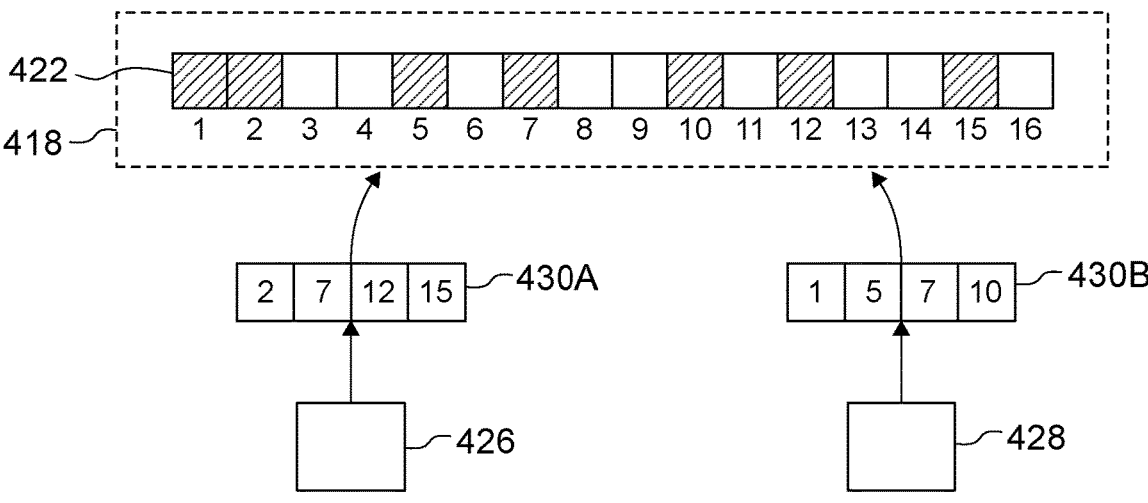
Figure 5:
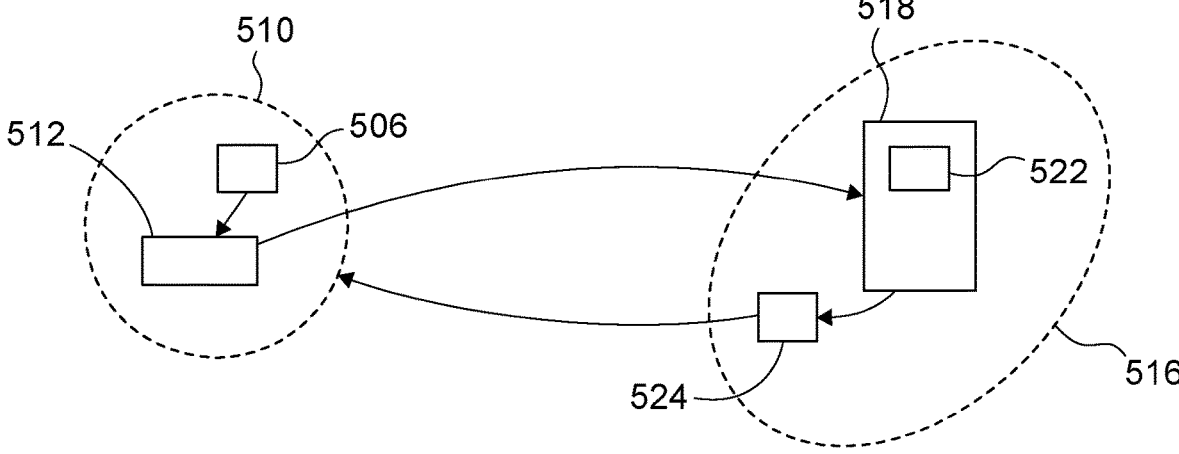

In order to better illustrate the above-described method, an illustrative conceptual example will now be discussed with reference to FIG. 4 and FIG. 5. It should be noted that this is purely for illustrative purposes. For ease of comparison with FIG. 3, elements of FIG. 4 and FIG. 5 similar to corresponding elements of FIG. 3 are labelled with reference signs similar to those used in this Figure, but with prefixes "4" and "5" instead of "3".

In the present example, a first digital content element 406, 506 is a representation of an original digital content element (not shown). The representation is created in a suitable fashion, e.g., by use of one or more hashing functions. It will be appreciated that, as described above, this is only for exemplary purposes and that the first digital content element could equally well be a representation of a portion of an original digital content element.

A content database 418, 518 comprises a stored digital content element 422, 522. In the present example, purely for purposes of conciseness and ease of explanation, it will be assumed that the stored digital content element takes the form of a 16-bit array. The content database comprises information relating to a plurality of digital content elements, all of which have been created in a manner identical to the first digital content element. The stored digital content element may be of any suitable type or format (e.g., a bloom filter).

For purposes of the present example, the stored digital content element 422, 522 is assumed to comprise information relating to two digital content elements: a second digital content element 426 and a third digital content element 428.

The digital content elements are not, themselves, stored in the content database. Instead, a representation of each of the digital content elements is stored in the content database.

In the present example, the representation takes the form of one or more bits corresponding to one or more of the 16 bits of the stored digital content element 422. During creation of a representation 430A of the second digital content element 426, the following bits have been set: 2, 7, 12 and 15. When it is stored in the content database, the corresponding bits in the content database 422, 522 are set. Similarly, during creation of a representation 430B of the third digital content element 428, the following bits have been set: 1, 5, 7 and 10. When the second stored digital content element is stored in the content database, the corresponding bits are set in the content database. It will be noted that the second digital content element and the third digital content element share a bit.

In the present example, a search query 402, 502 is derived in a similar manner from the first digital content element 406. The search query is derived so as to comprise a number of bits corresponding to one or more of the 16 bits of the stored digital content element 422. Specifically, in the present example, the following bits have been set 2, 7, 12 and 15.

In order to determine whether the first digital content element is present in the content database 418, 518, a first entity 504 transmits the search query 402, 502 to a second entity 516. The search query contains one or more of the set bit numbers of the first digital content element (e.g. 2, 7 and 12). If the bits of the search query all result in a match when compared with the stored digital content element, it can be deduced that the first digital content element is stored in the content database. In the present example, the first digital content element is identical to the second digital content element.

It is important to note that, whilst there is a risk of a false positive to occur, in this implementation, it is not possible for a false negative to occur. In other terms, it is possible that a match may be found where there is not actually a match, but it is not possible for a match to remain unidentified.

As discussed above, it may in certain circumstances be disadvantageous, undesirable or illegal that the second entity, or any other third parties, be able to deduce or infer the exact nature of the first digital content element. Accordingly, the first entity may send only a subset of the bits that represent the first digital content element.

Based on the search query 402, 502, a set of search results 524 is derived. The search results are subsequently transmitted to the first entity 504 in a suitable manner, for example by way of the communication network used to transmit the search query.

It will be appreciated that the above is purely an explanatory example for illustrating the present search methodology, and is not intended to be limiting in any way. In actual implementations, a search query would not only contain bit numbers for the first digital content element, as this would allow a malicious third party to directly identify the first digital content element. In actual implementations, therefore, additional operations and measures are used in order to increase the privacy of the search query and the first digital content element. A number of these will be discussed in more detail in the following.

Figure 6:
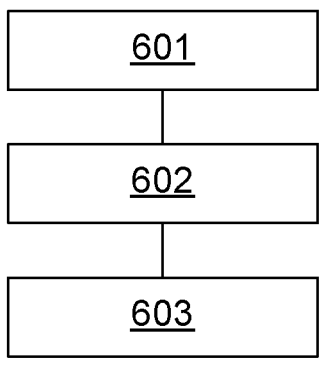
FIG. 6 illustrates an exemplary step of deriving a search query such as may be implemented in an embodiment of the invention.

An exemplary step of deriving a search query, such as may be implemented in the method described with reference to FIG. 2, will now be described with reference to FIG. 6. For ease of comparison with preceding Figures, elements of FIG. 6 similar to corresponding elements of preceding Figures are labelled with reference signs similar to those used in these Figures, but with prefix "6".

In the present example, reference will be made throughout to a digital content element. However, it is to be noted that this is purely for ease of explanation and clarity. The methodology of the present example could, in principle, equally well be applied to part of a digital content element only (i.e., a subset of a digital content element). Further, it will be appreciated that the digital content element may comprise data relating to or representing one or more elements, sets or other digital content elements. Additionally, it is to be noted that the digital content element could equally well comprise the data being searched for and/or a representation of the data (e.g., a hash or a similarity hash) being searched for.

In a first deriving step 601, a total number of sub-elements comprised in the first digital content element is determined. The first digital content element may comprise any suitable number of sub-elements. Typically, the number of sub-elements in a digital content element is fixed and is dependent on one or more properties of the digital content element. However, in some instances, the number of sub-elements comprised in the digital content element is variable and dependent on one or more factors. In some examples, the number of sub-elements comprised in the digital content element is selected by a third-party application or a user.

The number of sub-elements in the first digital content element may be determined in any suitable fashion. In some examples, the number of sub-elements is pre-determined on creation or generation of the first digital content element. The number of sub-elements may be dependent on one or more properties of the digital content element. For example, the first digital content element may have a particular format, encoding, encryption or other properties that defines the number of elements. Examples include, without limitation, hashes which comprise a predetermined number of bits.

In such examples, the number of sub-elements may be contained in a file header, file footer, or meta-data container. In such examples, the first deriving step is confirmatory in nature and may in some examples be considered optional.

The first digital content element may not always have a fixed and/or pre-determined number of sub-elements. For some types of files, or collections of files, a fixed file size is either not possible or non-desirable.

In a second deriving step 602, at least a first portion of the first digital content element is selected. The first portion may be selected based on any suitable criteria and using a suitable methodology. The selection step may be dependent on one or more properties of the first digital content element. Any suitable or relevant portion (or portions) of the first digital content element may be selected.

It will be appreciated that the selection step may be dependent on the format or properties of the first digital content element. Purely for explanatory purposes, it will in the present exemplary deriving step be assumed that the first digital content element comprises at least one sub-element. The at least first portion may comprise the at least one sub-element. The at least first portion may comprise any suitable portion of the at least one sub-element. It will be appreciated, that numerous specific implementations may be envisaged.

Thus, in an example, wherein the first digital content element comprises one sub-element, the first portion comprises the entirety of the sub-element. In another example, wherein the first digital content element comprises one sub-element, the first portion comprises a portion of the one sub-element. In another example, wherein the first digital content element comprises a plurality of sub-elements, the first portion comprises the entirety of one sub-element of the plurality of sub-elements. In another example, wherein the first digital content element comprises a plurality of sub-elements, the first portion comprises a portion of one sub-element of the plurality of sub-elements. In another example, wherein the first digital content element comprises a plurality of sub-elements, the first portion comprises a portion of a second plurality of sub-elements of the plurality of sub-elements. For the sake of explanation, if the first digital content element is assumed to comprise ten sub-elements, the deriving step may be performed such that the first portion comprises three sub-elements.

In circumstances where the first portion is selected so as to comprise a portion of one or more sub-elements, any suitable portion or section of the one or more sub-elements may be selected. In some examples, the first portion is selected so as to comprise a plurality of portions, wherein each portion is taken from a separate one of the plurality of sub-elements.

Depending on the file format used for the first digital content element, the first portion may comprise a number of discrete components (e.g., information units, bits, bytes or blocks) from a relevant section or sub-element of the first digital content element or one or more sub-elements of the first digital content element. It will be appreciated that the specific selection of discrete components may depend on the format, encoding and/or encryption of the first digital content element. In some examples, the first portion comprises one or more of: a data file; representation of a data file; a block of a data file; or a representation of a block of a data file. In some examples, the first portion comprises one or more blocks of: a data file; or a representation of a data file. In some examples, the first portion comprises one or more bytes of at least one of: a block of a data file or a representation of a block of a data file; a data file; or a representation of a data file. In some examples, the first portion comprises one or more bits of at least one of: a byte of a block of a data file or representation of a block of a data file; a byte of a data file or a representation of a data file; a block of a data file or a representation of a data file; or a data file or representation of a data file.

The first portion may be selected from any suitable part of a particular section or sub-element of the first digital content element. In some examples, a selected number of most significant bits of a sub-element of the first digital content element are selected. In an example, a selected number of most significant bits of a selected block of the first digital content element are selected.

In some examples, a selected number of least significant bits of a sub-element of the first digital content element are selected. In an example, a selected number of least significant bits of a selected block of the first digital content element are selected. In an example, a selected number of least significant bits of a selected byte of the first digital content element are selected.

In some examples, a selected number of bits are selected at a corresponding number of bit positions of a sub-element of the first digital content element. Any suitable bit positions may be selected. In some examples the bit positions are selected randomly. In some examples, the bit positions are selected so as to form a contiguous set. In some examples, the bit positions are selected so as to form a non-contiguous set. In some examples, the selected number of bits are selected at random bit positions.

The specific portion of the first digital content element to be selected may be predetermined. For example, it may be predetermined that a first number of most significant bits of the first portion is selected. In other examples, it may be predetermined that a first number of least significant bits of the first portion is selected. The first predetermined number may be any suitable number, including (without limitation) 1, 2, 4, 8, 16, 32, 64, 128, 256 or 512. The first predetermined number may be dependent on the properties of one or more of: the first digital content element; or any sub-elements of the first digital content element.

Alternatively, in some examples, the first portion of the dataset to be used in the search query is selected based on one or more selection criteria. In such examples, the deriving step comprises one or more selection sub-steps. In specific examples, the first portion comprises a selected number of elements of the first digital content element, wherein the selected number is determined based on one or more characteristics of the first digital content element. The selected number may be determined in a suitable fashion.

In some examples, the selected number is determined such that a ratio between the number of retrieved digital content elements of the content database and a maximum number of possible search results in the set of search results is below a first threshold. In other examples, the selected number is determined such that there is a guarantee that at least a match and a non-match result is included in the search results. It will be appreciated that a number of methodologies exist to carry out this within the scope of the present disclosure.

Once the bit positions and number of elements to be extracted from the first digital content element are determined, in a third deriving step 603, the search query is established using the selected first portion.

In the above, the contents of the search query have been described in general terms. As discussed above, where maintaining the privacy of a given search query is important, there are a number of methodologies that may be employed to increase privacy. An exemplary implementation, such as may be implemented in any of the preceding or subsequent examples, will now be discussed with reference to FIG. 7. It will be appreciated that this is intended to be illustrative and exemplary only, and is not intended to be limiting.

Figure 7:
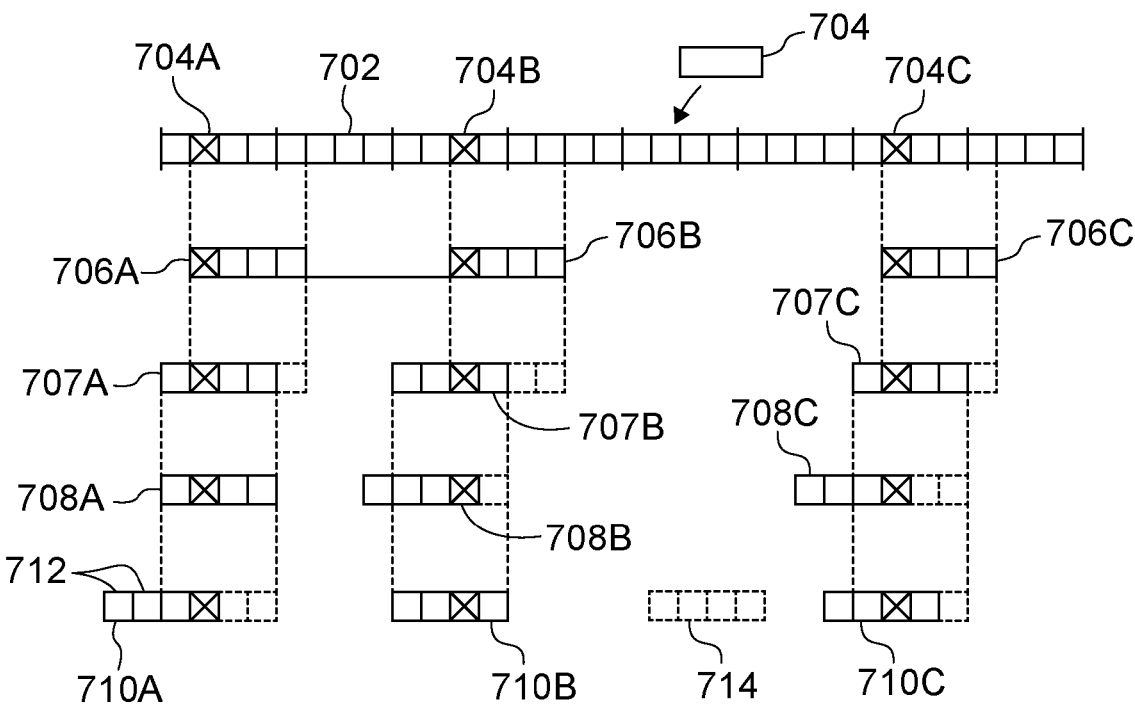
FIG. 7 shows a number of exemplary methodologies that may be implemented in an embodiment of the invention.

FIG. 7 illustrates an exemplary data element 702, which may for example be stored in a content database (not shown). Purely for illustrative and exemplary purposes, the exemplary data element comprises an array of 32 bits. The data element may have any suitable format or encoding, and may use any suitable methodology for storing content therein. The data element may, for example, be a bloom filter.

In the present example, a piece of content 704 is stored in the data element. The piece of content is stored in accordance with the formatting, encoding and methodology used by the data element 702. Purely for exemplary purposes, the piece of content is stored as three separate instances 704A, 704B, 704C within the data element. In the present example, each of the three instances is represented by a single bit being set at a specific location in the data element. In order to determine whether the piece of content is stored within the data element, it is necessary to determine whether each of the three bits is set.

As discussed above, even if the piece of content 704 is a representation of data of interest, a malicious third party that intercepted a search query (not shown) containing requests for the bits 704A, 704B, 704C, or a set of search results containing the instance, would potentially be able to determine the identity of the data of interest. It should be noted that, purely for purposes of conciseness and simplicity of the present example, only a single search query will be referred to. In reality, the bits 704A, 704B, 704C may be submitted in one or more separate search queries.

A range 706A, 706B, 706C is requested for each of the bits 704A, 704B, 704C. Any third party will, in principle, not be able to determine which of the bits contained in the ranges is the bit of interest. However, it will be appreciated that, in the present example, the bits of interest occupy the same location in each of the ranges. If a malicious third party was able to determine which bit position of each range contains the bit of interest, the third party would be able to extract the bits of interest.

To increase privacy, the bit address of each of the ranges 706A, 706B, 706C is truncated. In the present example, wherein the exemplary data element is comprised of 32 bits, each of the ranges has a 6-bit address that describes the location in the digital content element. In the present example, a number of modified ranges 707A, 707B, 707C is derived by truncating the 6-bit address for each of the ranges 706A, 706B, 706C. In the present example, the two least significant bits of each 6-bit address is removed. As a result, each of the modified ranges still contain the bits of interest, but the bits of interest are no longer in the same location within each range. Any third parties will not be able to determine which of the bits contained in the ranges contains the data of interest.

However, whilst this may guarantee privacy for an individual search query, it will be appreciated that, if a large number of search queries is made for the piece of content from separate requesting entities, a malicious third party may potentially be able to infer the identity of the piece of content. In essence, ranges requested by a first requesting entity for a piece of content will be substantially identical to ranges requested by a second requesting identity for the same piece of content. Whilst the ranges do not explicitly identity the piece of content, a malicious third party may nevertheless be able to infer that both requesting entities are searching for the same piece of content. In some cases, such inferences may need additional information (e.g., without limitation, traffic patterns, traffic timings or other network-related information).

Hence, to further increase privacy, a set of randomised ranges 708A, 708B, 708C is derived by subtracting a random integer from each of the modified ranges 707A, 707B, 707C. Any suitable number may be subtracted from each range. In the present example, a random integer in the range 0 to 3 is subtracted from each range.

By introducing a random subtraction, it becomes harder for any third parties to compare or correlate searches for the piece of content since the individual ranges will no longer be identical. For illustrative purposes, a second set of randomised ranges 710A, 710B, 710C is shown. The second set of randomised ranges could, for example, be comprised in a second search query made by a second requesting entity that wishes to search for the piece of content. Based on the first and second set of randomised ranges, a malicious third party would not be able to determine with certainty that both sets are used to search for the same piece of content.

If any of the ranges (such as is the case with the first randomised range 710A in the present example) were to fall partially or wholly outside the array, additional bits 712 may be added or derived so as to maintain the properties of the range. A number of implementations of this may easily be envisaged.

To further increase privacy, it is possible to change or randomise the order of the randomised ranges within the set. This further reduces the ability of a malicious third party to make inferences or deductions relating to the identity of the piece of content or the identity of requesting entities that may be searching for it.

It will, of course, be appreciated that the methodologies for increasing privacy discussed in the present example are exemplary only and not intended to be limiting. Additional or alternative methodologies may be used, either in isolation or in any suitable combination.

Purely by way of example, it is possible to add one or more additional randomised ranges 714 into a search query. Such additional randomised ranges do not relate to any of the bits 704A, 704B, 704C but are generated purely for additional privacy. The additional randomised ranges may be derived at any suitable time, for example when the search query is generated.

It will, of course, be appreciated that, whilst illustrated as having 32 bits, the digital content element 702 may comprise any suitable number of bits. Further, despite only a single piece of content 704 being illustrated and discussed in the present example, the digital content element may comprise any suitable number of pieces of content. For example, the digital content element could be several megabytes or gigabytes in size and could comprise millions of piece of content (e.g., if the digital content is a bloom filter).

Figure 8:
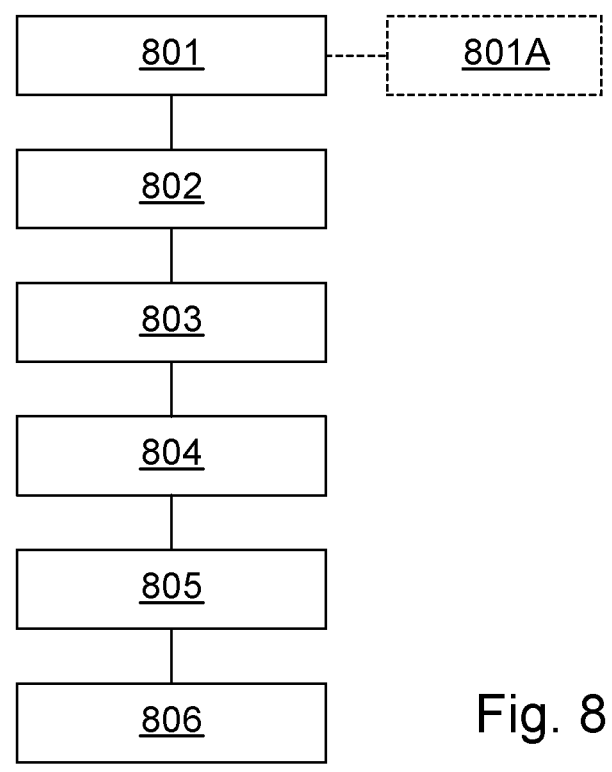
FIG. 8 and FIG. 9 illustrate a second embodiment of the present invention.
Figure 9:
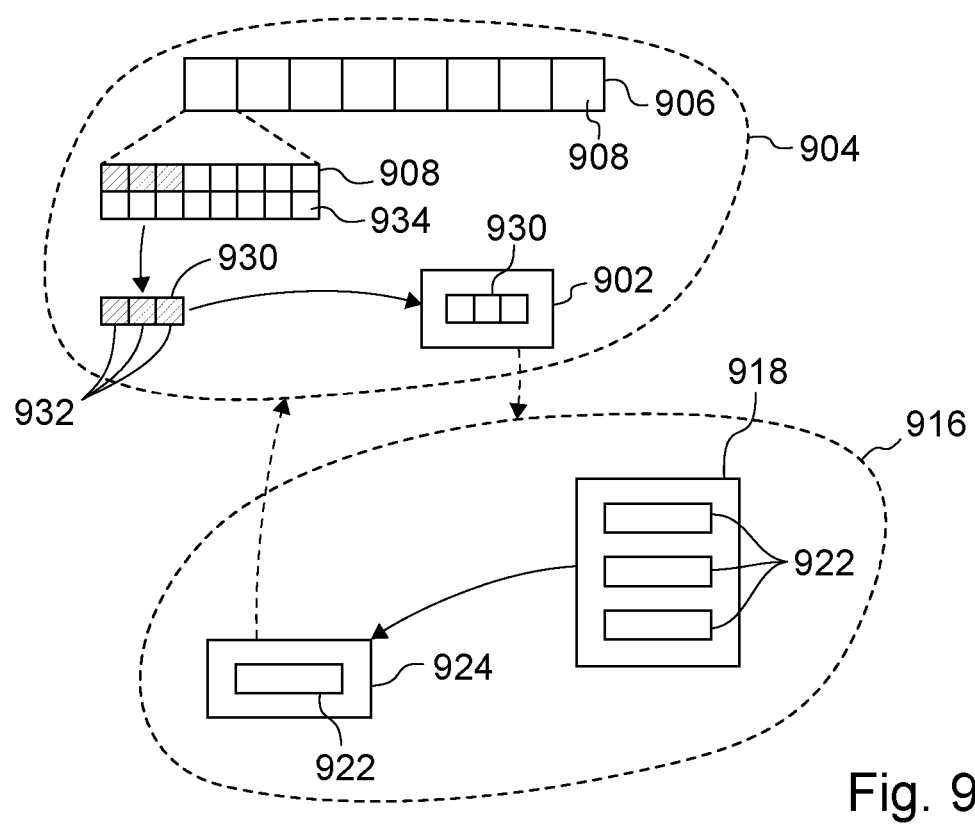

To illustrate the above-described methodologies, an exemplary implementation will now be discussed with reference to FIG. 8 and FIG. 9. For ease of comparison with preceding Figures, elements of FIG. 9 similar to corresponding elements of preceding Figures are labelled with reference signs similar to those used in these Figures, but with prefix "9"

In this example, both the first digital content element 906 as well as all of the stored digital content elements 922 stored in the content database 918 at the second entity 916 are assumed to be comprised of 128-bit hashes (i.e., each hash contains 128 bits). It will be appreciated that this is purely for exemplary purposes in order to assist with the understanding of the principles of the present disclosure.

As described above, the first digital content element 906 may comprise any number of sub-elements 908. In the present example, the first digital content element is comprised of eight sub-elements, each sub-element comprising an identical number of information units 934 (e.g., 'bits'). Thus, in the present example, each sub-element of the first digital content element comprises 16 bits. It should be noted that, in the present example, the terms information units and bits will be used interchangeably.

In a first step 801, a plurality 930 of most significant bits is extracted from at least one of the sub-elements 908 of the first digital content element 906. The plurality of most significant bits may comprise any suitable number of bits. The number of bits in the plurality of most significant bits may be selected in a suitable manner. In some examples, number is predetermined. In some examples, the number may be one of: 1; 2; 3; 4; 8; or 16. The extracted plurality of most significant bits may also be referred to as a 'lookup'.

In some examples, the number of bits in the plurality of most significant bits is determined in a determination step 801A that is performed prior to the first step.

This determination step may be carried out in a suitable manner, for example by way of one of the exemplary methodologies described above.

In a second step 802, a search query 902 is established based on the extracted plurality 930 of most significant bits 932. The search query may be established in any suitable manner. In some examples, the establishing step comprises one or more specific operations or sub-steps. In some examples, one or more additional data elements are added to the search query, including (but not limited to): meta data; time stamp; location data; user device identification or authentication data; or data relating to the user.

In some examples, some or all of the data comprised in the search query is encoded, encrypted or otherwise transformed in a suitable manner.

In a third step 803, the search query 902 is transmitted to a second entity 916, the second entity comprising a content database 918. The content database comprises one or more stored digital content elements 922. This step may be performed in any suitable manner, as substantially described above. Typically, the transmission step is carried out by way of a communication network to which both the first and second entities are connected.

It is to be noted that, whilst shown separately in the present example, the stored digital content elements 922 may be stored in any suitable fashion. In some examples, the stored digital content elements may be comprised in a single stored element (e.g., a bloom filter or a cuckoo filter). In other examples, each stored digital content element is stored as a discrete entity. Further, in some examples, the stored digital content elements comprise representation of digital content elements.

In a fourth step 804, a set of search results 924 based on the search query 902 is derived, the set of search results comprising a first number of retrieved digital content elements 936 of the content database 918. The set of search results is derived in any suitable manner.

In some examples, the set of search results 924 is derived so as to comprise any stored digital content elements 922 in the content database 918 that match the search query. In a specific example, the set of search results comprises all stored digital content elements of the content database that comprise a number of most significant bits matching the most significant bits of the first digital content element 906.

In a fifth step 805, the set of search results 924 is transmitted to the first entity 904. It will be appreciated that the transmission step may comprise one or more specific operations or sub-steps in a manner similar or identical to the second step described above.

In a sixth method step 806, the set of search results 924 is matched with the first digital content element 906. The matching step may be performed in any suitable fashion and using any suitable number of sub-steps. In some examples, the matching step comprises determining whether the digital content element is present in the set of search results.

It will be appreciated that the above-discussed example is purely for illustrative purposes and is not intended to be limiting.

Figure 10:
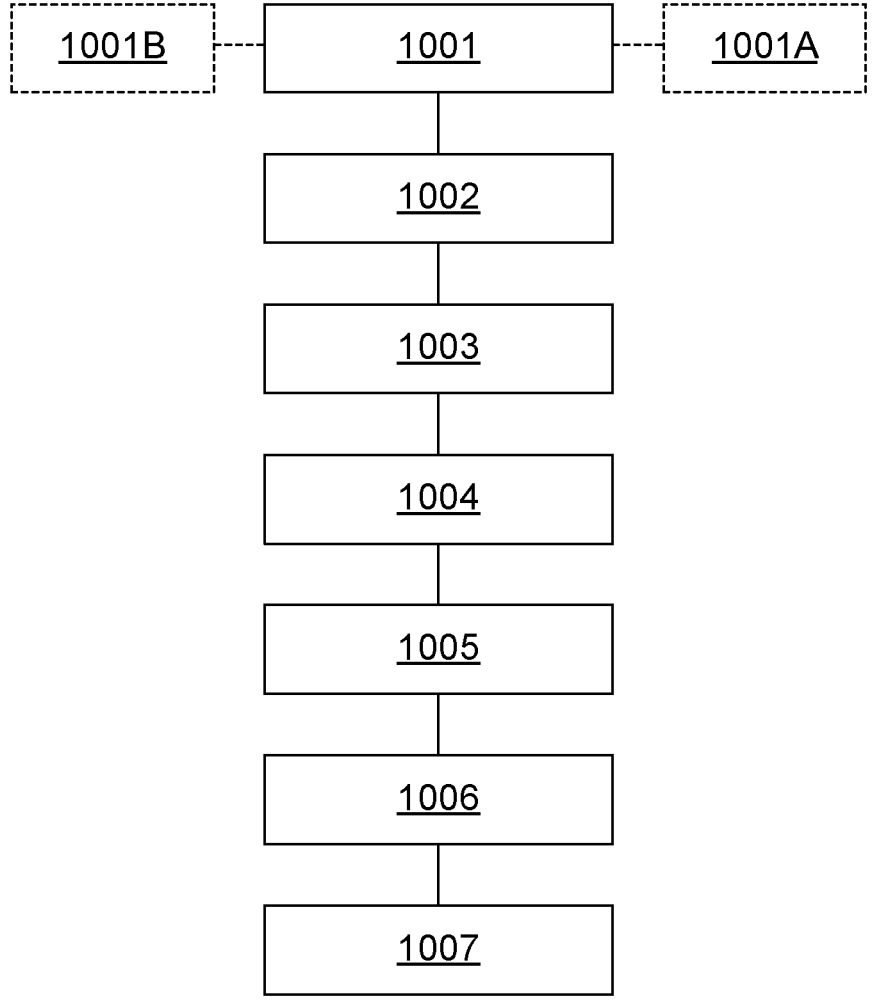
FIG. 10 and FIG. 11 show a third embodiment of the present invention.
Figure 11:
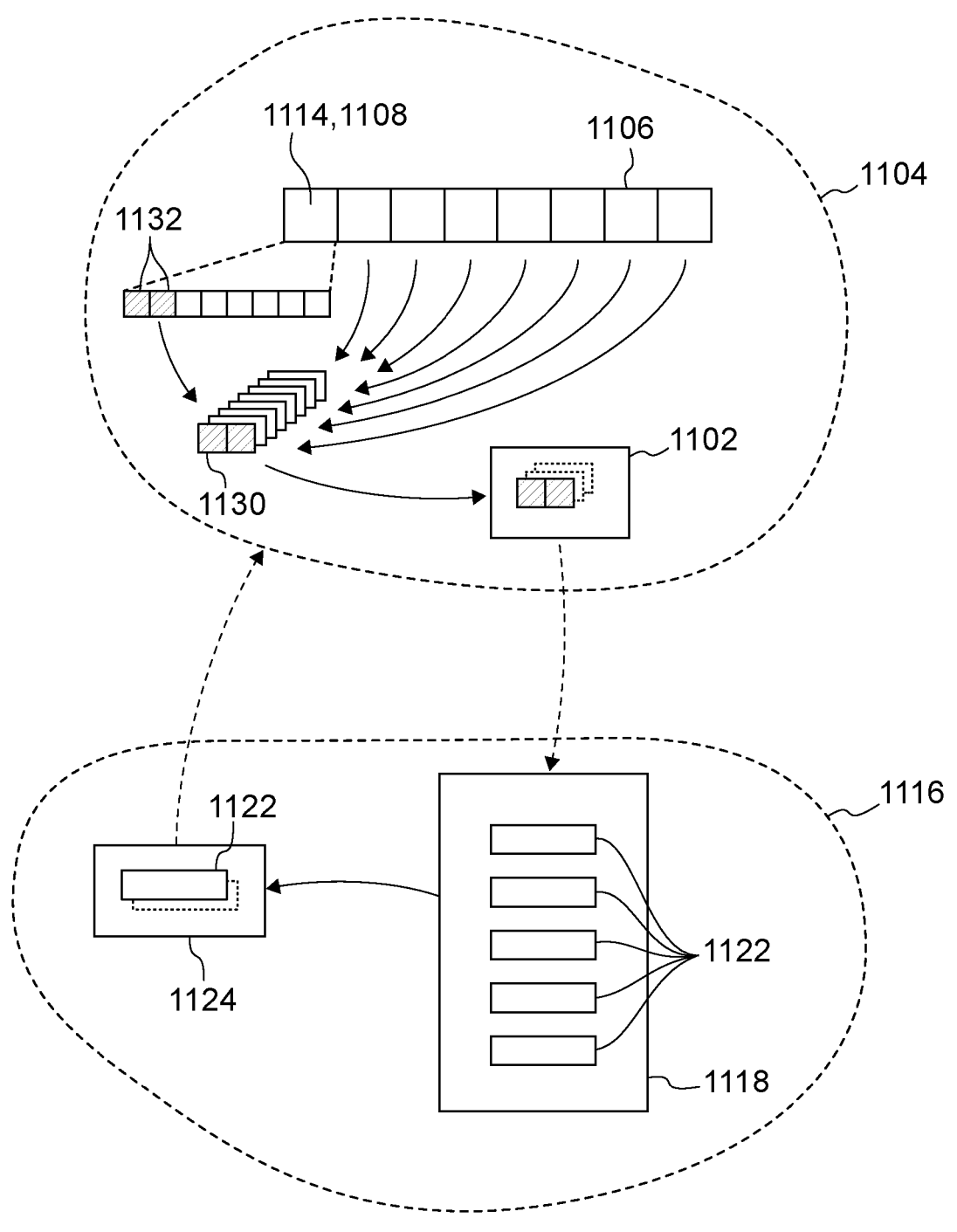

An example in accordance with an embodiment of the present disclosure will now be discussed with reference to FIG. 10 and FIG. 11. For ease of comparison with preceding Figures, elements of FIG. 11 similar to corresponding elements of preceding Figures are labelled with reference signs similar to those used in these Figures, but with prefix "11".

In a first step 1001, at least one set 1130 of representation units is derived from at least a first portion 1114 of the first digital content element 1106, wherein the at least one set of representation units comprises one or more representation units 1132. Similarly to the preceding examples, the first digital content element comprises data of interest to the first entity. The first digital content element may comprise any suitable number of information units (e.g., bits). In some examples, similarly to the example discussed with reference to FIGS. 8 and 9 above, the first digital content element comprises 128 information units (e.g., if the first digital content element is a 128-bit hash). The first step may be performed on any suitable device. In the present example, the first step is performed on a device operated or owned by a first entity 1104.

In the present example, the first digital content element 1106 is a representation of one or more original digital content elements (not shown). It will be appreciated, however, that the first digital content element could, equally well, be a representation of one or more portions of one or more original digital content elements. The first digital content element may be created in any suitable manner as part of the exemplary method or may have been created prior to the commencement of the exemplary method. In a specific example, the first digital content element is a hash generated based on the original digital content element. Any suitable hashing function may be used, such as (without limitation): MD5; SHA-2; SHA-384; SHA-256; or CRC32. As discussed above, the use of representations of data may be advantageous, required or desired in circumstances where the data cannot or must not be disseminated or shared. A number of specific examples of such creation steps will be presented in the following.

The at least one set 1130 of representation units may be derived in any suitable fashion and using any relevant or suitable number of sub-steps. The representation units may be derived according to a suitable set of criteria, rules, algorithms or requirements. Examples of such criteria will be discussed in more detail in the following.

In some examples, the number of representation units 1132 being derived depends on one or more of: properties or characteristics of the first digital content element 1106; restrictions, requirements, properties or characteristics of the computing system on which the first digital content element is stored or operated upon; or properties, characteristics, restrictions or requirements imposed by any software applications that handle, operate upon or otherwise deal with the first digital content element.

Typically, files are subdivided into one or more sub-elements 1108 according to various properties or characteristics of the computing system, the formatting of same, as well as the properties of the files themselves. As such, a digital content element may be divided into segments or blocks in accordance with the formatting of the digital content element, or with the structural requirements or properties of the computing system or operating system.

Any suitable first portion of the first digital content element 1106 may be used. In the present example, the first portion comprises at least one sub-element 1108 of the first digital content element. In the present example, at least one set 1130 of representation units, is derived from the at least one sub-element 1108 of the first digital content element 1106, the set being comprised of a plurality of representation units 1132. Any suitable number of sets of representation units may be derived.

Purely by way of example, if the first digital content element 1106 is assumed to be a 128-bit hash, such as is discussed in the above examples, the first digital content element may be divided into eight equal sub-elements 1108 (which may also be referred to as 'blocks'). Each of said eight sub-elements, in this example, is comprised of sixteen individual information units, or 'bits', of the first digital content elements. In this example, during the first step, a set of representation units, the set being comprised of a plurality of representation units, is derived for at least one of the sub-elements of the first digital content element. In some examples, a set of representation units is derived for a plurality of the sub-elements of the first digital content element. In some examples, a set of representation units is derived for each of the sub-elements of the first digital content element.

Each set 1130 of representation units may comprise any suitable or relevant number of representation units 1132. In some examples, each set of representation units comprises the same number of representation units. In some examples, each set of representation units comprises a unique number of representation units. As described above, the number of representation units in each set of representation units may be selected according to a set of criteria. In some examples, the representation units in each of the sets are selected to comprise the most significant bits of the respective sub-elements of the first digital content element. In some examples, the representation units in each of the sets are selected to comprise the least significant bits of the respective sub-elements of the first digital content element, in other examples, the representation units may be a specific combination or a random selection of bits.

Returning to the above example wherein the first digital content element comprises a 128-bit hash, and wherein it is divided into eight 16-bit blocks, a set of representation units is derived for each of the eight blocks. In the present example each set of representation units comprises a first number of representation units. The first number may be any relevant, suitable or advantageous number, including (without limitation): 1, 2, 4, 8 or 16. In the present example, each set of representation units comprises 2 representation units. In other terms, two representation units, or bits, are derived for each block of the first digital content element.

Additional security or privacy operations may in some examples be carried out during the derivation step (e.g., without limitation, the privacy-related operations discussed above with respect to FIG. 7).

In an optional first sub-step 1001A, the first digital content element 1106 is divided into a plurality of sub-elements 1108, each of which comprises one or more information units. The sub-elements may have any suitable properties or characteristics. As discussed above, in some examples, each of the sub-elements comprises the same number of information units.

As discussed, files or content elements are typically subdivided or segmented into a number of sub-elements (e.g., blocks). In many examples, the existing segmentation or block structure of the digital content element is selected. In such examples, the optional sub-step is either not necessary or is used as a confirmatory step where the structure of the first digital content element is confirmed or checked. However, in some examples, it is desirable and/or advantageous to divide the first digital content element in a manner that differs from the formatting or system segmentation.

Returning to the above example, wherein the first digital content element is a 128-bit hash, it may under certain circumstances be desirable or advantageous to divide the first digital content element into 2 or 4 sub-elements (rather than the above-mentioned 8 sub-elements). In other circumstances, it may be desirable or advantageous to divide the first digital content element into a different number of sub-elements. It will be appreciated that the specific number of sub-elements chosen in a specific circumstance may be dependent on any number of factors.

As discussed above, in some examples, the method comprises creating the first digital content element 1106. In an optional second sub-step 1001B the first digital content element is created, the step of creating the first digital content element comprising: transmitting an initial request message from the first entity to the second entity, the initial request message comprising a request for at least a first required characteristic; receiving an initial response message from the second entity at the first entity, the initial response message comprising at least a first required characteristic; and generating the first digital content element based on the at least first required characteristic. An example of such an optional step will be discussed in more detail in the following.

In a second step 1002, at least one of the one or more sets 1130 of representation units is selected. Any suitable number of sets of representation units may be selected. The selected sets of representation units may relate to any number of corresponding sub-elements 1108 of the first digital content element 1106. Effectively, each set of representation units acts as a representation of the corresponding sub-element of the first digital content element. In other terms, in order to select a particular sub-element of the first digital content element, the corresponding set of representation units is selected.

As discussed above, selecting a lower number of sets of representation units may result in a larger number of search results. Conversely, a larger number of sets may result in a higher possibility that the second entity is able to infer or derive information as to the first digital content element 1106.

The at least one set 1130 of representation units may be selected according to any suitable selection criteria. In some examples, the selection criteria for selecting the at least one representation elements may be predetermined or fixed. In some examples, the selection criteria are evaluated in a sub-step prior to the selection step. The selection criteria may depend on any relevant factors or characteristics.

As discussed above, in some examples, it is advantageous or desirable to select the number of sub-elements 1108 to be included in a search query 1102 in accordance with a set of criteria. For example, it may be advantageous or necessary to ensure that the second entity, or the third party operating the second entity is unable to determine which digital content element 1106 is being queried, or which of the stored digital content elements 1122 may be of interest to the first entity. In some examples, the number of sub-elements to be included is determined in an additional method step prior to carrying out the steps of the present method. Any such additional method steps may be performed at any suitable time, whether in connection with the present method or prior to the present method.

Purely for illustrative purposes, we return to the above-discussed example wherein the first digital content element comprises a 128-bit hash. As discussed, the first digital content element is divided into eight 16-bit blocks, or sub-elements. A set of representation units that comprises 2 representation units has been derived for each of the blocks. In this example, in an illustrative second step, a plurality of sets of representation units is selected. Specifically, in the present example 3 sets of representation units are selected, each of the 3 sets representing a corresponding 16-bit block. In some examples, one set of representation units is selected.

In a third step 1003, a search query 1102 is established based on the at least one selected sets 1130 of representation units. Any suitable operations or procedures may be carried out as part of the establishing step. In some examples, all sets 1130 of representation units selected during the second step are used to establish the search query. In some examples, a portion of the selected sets 1130 of representation units are used to establish the search query.

In some examples, the search query includes additional elements or other information. In some examples, the step of establishing the search query comprises generating at least one additional sets of randomised representation units (not shown) and including the at least one additional sets of randomised representation units in the search query. In order to increase privacy of the search query, it may be useful or advantageous to include "dummy" sets of representation units that contain randomised representation units. A malicious third party will not be able to determine which of the sets of representation units included in the search query relate to the first digital content element.

In some examples, the search query 1102 is formatted, encoded or encrypted in a suitable manner. This may be to, for example, facilitate transmission of the search query. It will be appreciated that a number of such operations or processes may be envisaged within the scope of the present disclosure. Accordingly, no further detailed discussion of these processes or operations will be presented.

Briefly returning to above-discussed illustrative example, one set 1130 of representation units (i.e., two selected representation units 1132) are used to establish the search query 1102. The selected representation units are added to the search query, after which the search query is formatted, encoded and encrypted.

In a fourth step 1004, the search query 1102 is transmitted to a second entity 1116, the second entity comprising a content database 1118. The search query may be transmitted in a suitable manner and may use a suitable transmission means. In an example, the search query is transmitted by way of a communication network to which both the first entity and the second entity is connected. Examples include, without limitation: the internet; a local network; mobile communications networks or a direct connection.

In a fifth step 1005, a set of search results 1124 is derived based on the search query, the set of search results comprising any stored digital content elements 1122 of the content database 1118 matching the search query. The search results may be derived in any suitable fashion. In the present example, the second entity compares the at least one representation element comprised in the search query with the dataset database.

In the present example, the content database comprises a bloom filter. In other examples, the content database comprises a plurality of representations of datasets (e.g., hashes). In yet other examples, the content database comprises a Cuckoo filter. It will be appreciated that these examples are purely for illustrative purposes and not intending to be limiting in any way. Numerous specific implementations of the dataset database may be envisaged within the scope of the present disclosure.

Any stored digital content elements 1122 that match the at least one set of representation units 1130 are extracted from the bloom filter in a suitable manner. Subsequent to the extraction, each of the extracted digital content elements are added to the set of search results.

In a sixth step 1006, the set of search results is transmitted to the first entity. As discussed above, the set of search results may be transmitted in any suitable manner. In an example, the set of search results is transmitted substantially in the same manner as the search query.

In a seventh step 1007, the set of search results 1124 is matched with the first digital content element 1106. The matching step may be performed in any suitable fashion and using any suitable number of sub-steps. In some examples, the matching step comprises determining whether the digital content element is present in the set of search results.

It will be appreciated that the above-described method may be implemented in a number of specific ways within the present disclosure. A number of such exemplary implementations of the exemplary methods will now be discussed in more detail. It will be appreciated that these examples are for illustrative purposes and are not intended to be limiting.

Figure 12:
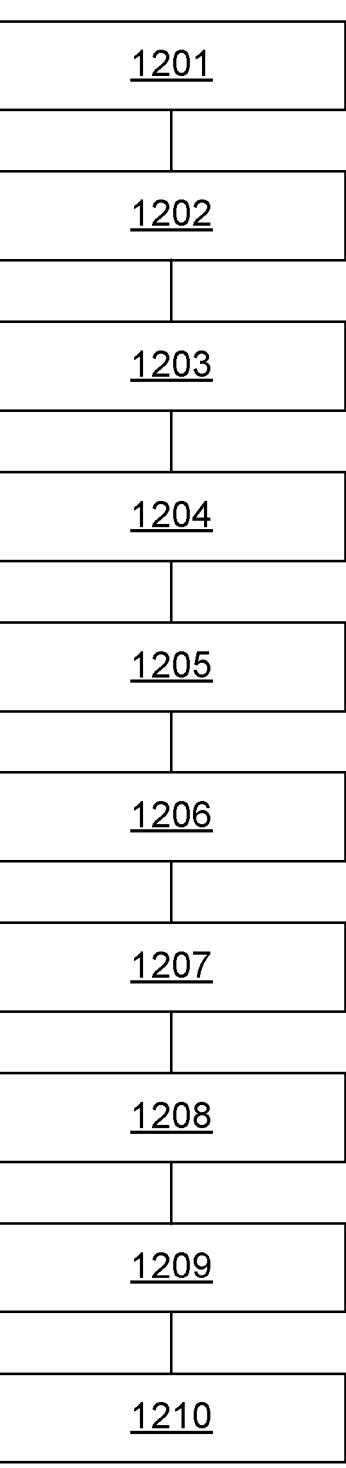
FIG. 12 and FIG. 13 illustrate a fourth embodiment of the present invention.
Figure 13:
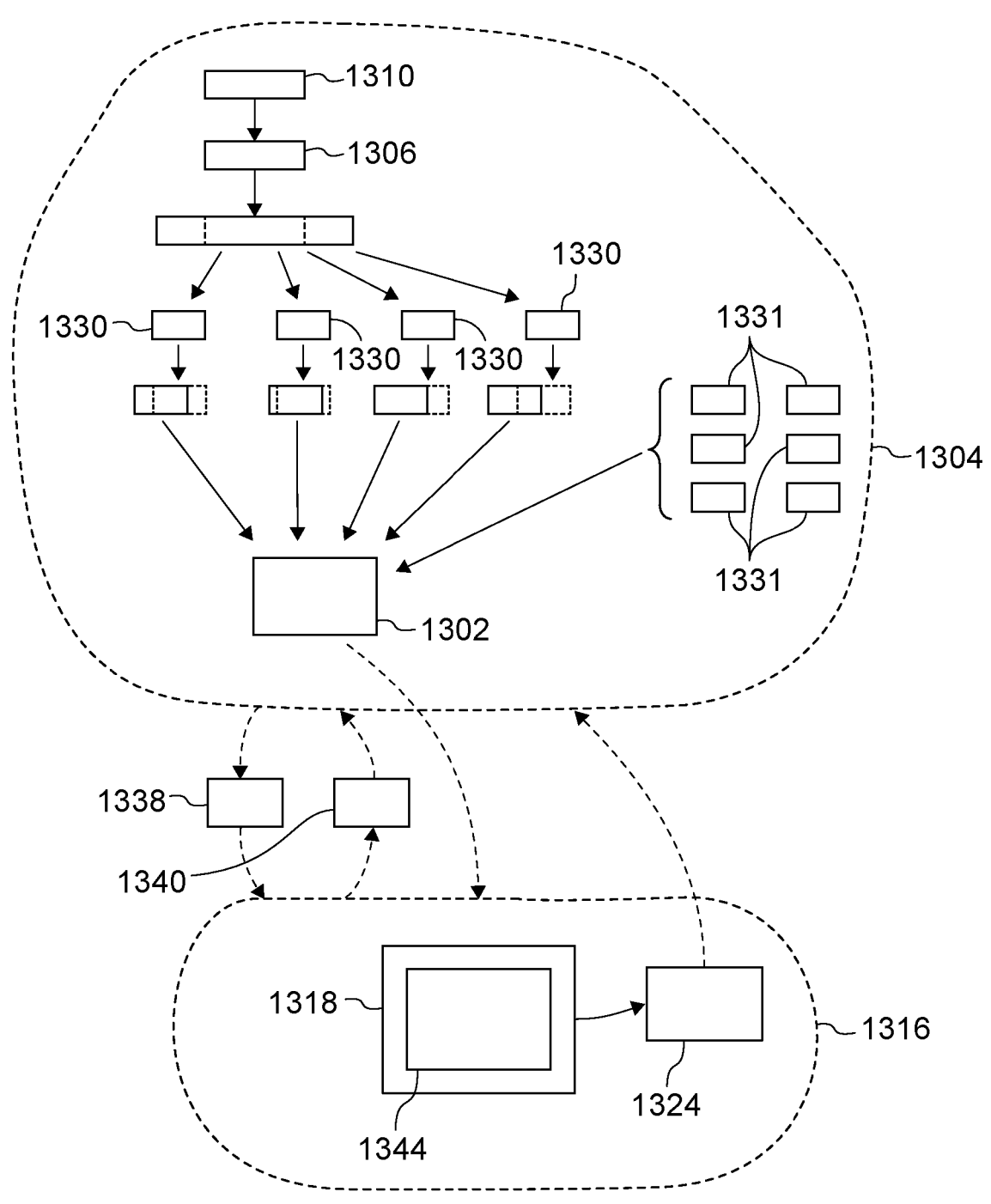

An exemplary implementation of a method in accordance with the present disclosure will now be discussed with reference to FIG. 12 and FIG. 13. For ease of comparison with preceding Figures, elements of FIG. 13 similar to corresponding elements of preceding Figures are labelled with reference signs similar to those used in these Figures, but with prefix "13".

In a first step 1201, a first entity 1304 transmits an initial request message 1338 to a second entity 1316. The second entity comprises or otherwise controls a content database 1318, the content database comprising a plurality of stored digital content elements. In the present example, the stored digital content elements are representations of other digital content elements (not shown). Further, in the present example, each of the stored digital content elements are stored as part of a single representation element 1344 (e.g., without limitation, a bloom filter).

The initial request message 1338 may comprise any suitable number of individual requests. In the present example, the individual requests comprise one or more of: a minimum size to guarantee that any set of representation units in the search query will result in at least one positive and one negative result; a required hashing or representation methodology to be used for the search query; or a number of sets of representation units required.

Selecting a minimum size for each set 1330 of representation units (which may also be referred to as a 'lookup') such that any of these sets will result in at least one positive and negative result increases the privacy of the search results. Even if a malicious third party was to intercept any of the communications of the present method, the third party would not be able to tell whether a given result is negative or positive.

The hashing or representation methodology to be used may typically be decided by the second entity. In order for the present method to function, it is necessary that the search query, and in particular the set of representation units, is formatted correctly such that the search query can be correctly processed.

As discussed above, the number of sets of representation units used in any search query directly affects the privacy of the communications.

In a second step 1202, the second entity 1316 transmits an initial response message 1340 to the first entity 1306. The initial response message may comprise any suitable information in response to the initial request message. In the present example, the initial response message comprises the following information: a minimum size for the set of representation units of 4096 bits; the hashing type to be used is MD5; and the number of individual sets of representation unit to be used is four.

In a third step 1203, the first entity 1304 creates a first digital content element 1306, the first digital content element being a representation of an original digital content element 1310. In the present example, the first digital content element is created by taking a MD5 hash of the original digital content element. It will, of course, be appreciated that this is for purposes of the present example only, and that other types of hashing functions could equally well be used.

In a fourth step 1204, the first digital content element 1306 is encrypted. The encryption extends the first digital content element to include additional bits. The encryption may be carried out in any suitable fashion and by way of any suitable encryption mechanism. In the present example, the first digital content is extended so as to comprise 256 bits.

In a fifth step 1205, a plurality of sets 1330 of representation units are created. The creation step may comprise any suitable number of creation sub-steps. Any suitable number of sets may be created.

In the present example, 4 sets of representation units are selected from the first digital content element, each set comprising a 38-bit address. Each of the 4 sets of representation units is selected so as to have a particular size and/or range that is bigger than the minimum required size and/or range within the first digital content element. In the present example, each of the sets of representation units is created so as to have a size of 32,768 bits.

Subsequently to the selection step, a random value is subtracted from each of the sets of representation units, in order to further increase the privacy level of the communications. Any suitable value may be subtracted in any suitable manner from each of the sets of representation units. In the present example, the random value is in the range 0-32,767. It will be appreciated that this is purely for exemplary purposes, and that the subtraction step and/or subtraction value may be envisaged in multiple different fashions. If the result is negative, the result is added to $2^{38}$ in order to render it positive.

In a sixth step 1206, a search query 1302 is derived based on at least the four selected sets 1330 of representation units. It will be appreciated that the derivation step may, similarly to the preceding steps, comprise a number of specific sub-steps.

In the present example, the derivation step comprises adding the four selected sets 1330 of representation steps to the search query 1302. Additionally, the derivation step comprises adding six random sets 1331 of representation units to the search query. The second entity, or a malicious third party, cannot know whether any particular set of representation units is genuine or one of the randomised ones. Additionally, the second entity, or the third party, cannot know how many of the sets of representation units in the search query are genuine.

Subsequent to the adding sub-step, the resulting ten sets of representation units are sorted in ascending order. This further increases privacy since the second entity, or a malicious third party, will not be able to determine the proper order of any of the sets of representation units.

A number of additional processing, formatting or encoding sub-steps may further be carried out. However, for purposes of conciseness and clarity, these will not be discussed further in the present example.

In a seventh step 1207, the search query 1302 is transmitted from the first entity 1304 to the second entity 1316. The search query may be transmitted in any suitable fashion.

In an eighth step 1208, a set of search results 1324 is derived at the second entity 1316. As discussed above, the set of search results may be derived in any suitable fashion. In the present example, the content database 1318 returns a corresponding portion of the representation element 1344 for each of the sets of representation units 1330, 1331.

In a ninth step 1209, the set of search results 1324 is transmitted from the second entity 1316 to the first entity 1304. The first entity then uses the set of search results to determine whether a match has been found in the content database 1318 in a suitable fashion.

In a tenth step 1210, the set of search results 1324 is matched with the first digital content element 1306. The matching step may be performed in any suitable fashion and using any suitable number of sub-steps. In some examples, the matching step comprises determining whether the digital content element is present in the set of search results.

Figure 14:
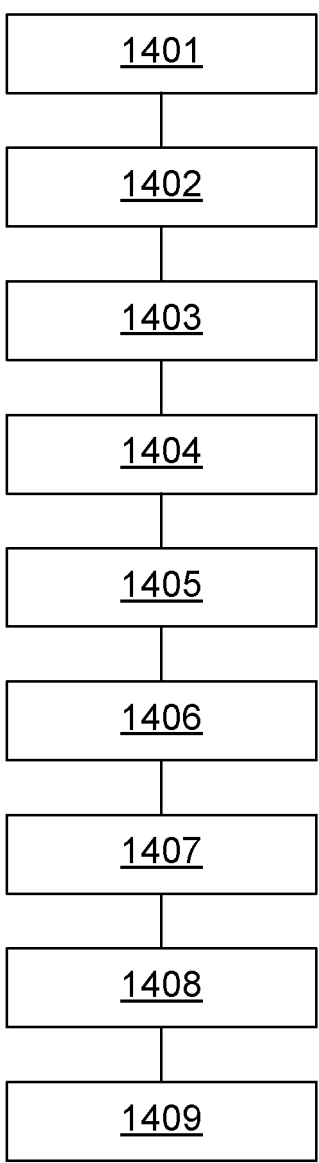
FIG. 14 and FIG. 15 illustrate a fifth embodiment of the present invention.
Figure 15:
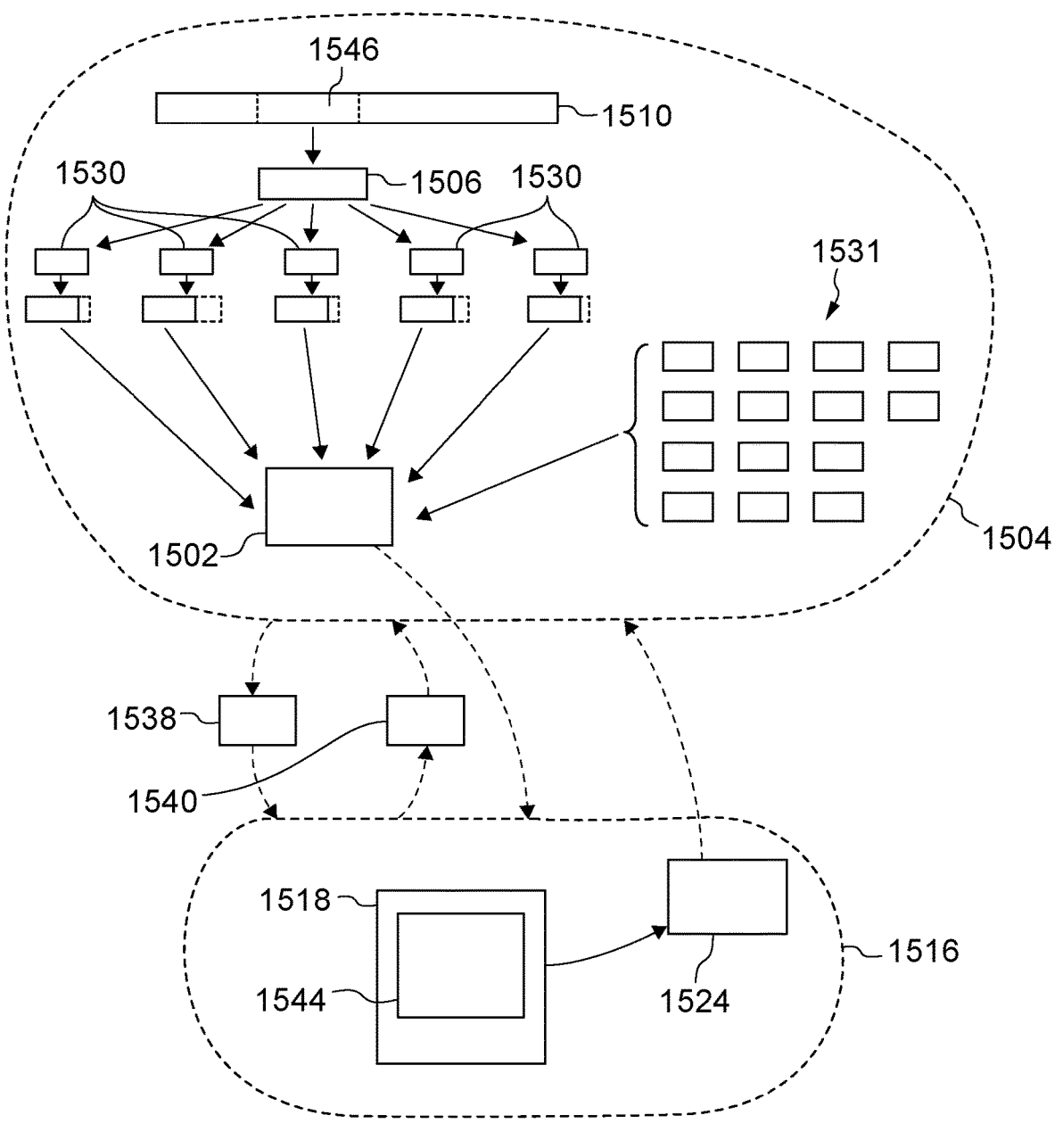

A further exemplary implementation of a method in accordance with the present disclosure will now be discussed with reference to FIG. 14 and FIG. 15. For ease of comparison with preceding Figures, elements of FIG. 15 similar to corresponding elements of preceding Figures are labelled with reference signs similar to those used in these Figures, but with prefix "15".

The present example is substantially similar to that described with reference to FIG. 12 and FIG. 13. The main difference between the present example and the one discussed in these figures is that the single representation element comprises stored digital content elements that are representations of portions of other digital content elements (e.g., sub-elements, blocks or other subdivisions of digital content elements).

In a first step 1401, a first entity 1504 transmits an initial request message 1538 to a second entity 1516. The second entity comprises or otherwise controls a content database 1518, the content database comprising a plurality of stored digital content elements. In the present example, and as discussed above, the stored digital content elements are representations of portions of other digital content elements (not shown). Further, in the present example, each of the stored digital content elements are stored as part of a single representation element 1544 (e.g., without limitation, a bloom filter).

The initial request message 1538 may comprise any suitable number of individual requests. In the present example, the individual requests comprise one or more of: a minimum size to guarantee that any set of representation units in the search query will result in at least one positive and one negative result; a required hashing or representation methodology to be used for the search query; or a number of sets of representation units required.

In a second step 1402, the second entity 1516 transmits an initial response message 1540 to the first entity 1506. The initial response message may comprise any suitable information in response to the initial request message. In the present example, the initial response message comprises the following information: a minimum size for the set of representation units of 4096 bits; the hashing type to be used is SHA256; and the number of individual sets of representation unit to be used 5.

In a third step 1403, the first entity 1504 creates a first digital content element 1506, the first digital content element being a representation of at least one randomly selected portion 1546 of the original digital content element 1510. Any suitable at least one portion of the original digital content element may be selected. Purely for purposes of conciseness and ease of explanation, in the present example a single randomly selected portion will be discussed, although it will be appreciated that any suitable or relevant number of randomly selected portions of the original digital content element could be selected, including (without limitation): 1; 2; 3; 4; 5; 6; 7; 8; 16; 32; or 64.

In the present example, the first digital content element is created by taking a SHA256 hash of the randomly selected portion of the original digital content element. It will, of course, be appreciated that this is for purposes of the present example only, and that other types of hashing functions could equally well be used.

In a fourth step 1404, a plurality of sets 1530 of representation units are created. The creation step may comprise any suitable number of creation sub-steps. Any suitable number of sets may be created.

In the present example, five sets of representation units are selected from the first digital content element, each set comprising a 38-bit address. Each of the five sets of representation units is selected so as to have a particular size and/or range that is bigger than the minimum required size and/or range within the first digital content element. In the present example, each of the sets of representation units is created so as to have a size of 131,072 bits.

Subsequently to the selection step, a random value is subtracted from each of the sets 1530 of representation units, in order to further increase the privacy level of the communications. Any suitable value may be subtracted in any suitable manner from each of the sets of representation units. In the present example, the random value is in the range 0-131,071. It will be appreciated that this is purely for exemplary purposes, and that the subtraction step and/or subtraction value may be envisaged in multiple different fashions. If the result is negative, the result is added to $2^{38}$ in order to render it positive.

In a fifth step 1405, a search query 1502 is derived based on at least the five selected sets 1530 of representation units. It will be appreciated that the derivation step may comprise a number of specific sub-steps.

In the present example, the derivation step comprises adding the five selected sets 1530 of representation units to the search query 1502. Additionally, the derivation step comprises adding 14 random sets 1531 of representation units to the search query. As discussed in the preceding example, the second entity, or a malicious third party, cannot know whether any particular set of representation units is genuine or one of the randomised ones. Additionally, the second entity, or the third party, cannot know how many of the sets of representation units in the search query are genuine.

Subsequent to the adding sub-step, the resulting ten sets of representation units are sorted in ascending order. This further increases privacy since the second entity, or a malicious third party, will not be able to determine the proper order of any of the sets of representation units.

A number of additional processing, formatting or encoding sub-steps may further be carried out. However, for purposes of conciseness and clarity, these will not be discussed further in the present example.

In a sixth step 1406, the search query 1502 is transmitted from the first entity 1504 to the second entity 1516. The search query may be transmitted in any suitable fashion.

In a seventh step 1407, a set of search results 1524 is derived at the second entity 1516. As discussed above, the set of search results may be derived in any suitable fashion. In the present example, the content database 1518 returns a corresponding portion of the representation element 1544 for each of the sets of representation units 1530, 1531.

In an eighth step 1408, the set of search results 1524 is transmitted from the second entity 1516 to the first entity 1504. The first entity then uses the set of search results to determine whether a match has been found in the content database 1518 in a suitable fashion.

As discussed above, for purposes of conciseness and clarity only, only a single randomly selected portion 1546 of the original digital content element 1510 is extracted and included in the first digital content element. However, it will be appreciated that the first digital content element could, in principle, equally well be comprised of a plurality of randomly selected portions of the original digital content element.

In such situations, the initial request message 1538 described above comprises a request for a minimum number of randomly selected portions 1546 of the original digital content element to be used, as well as a minimum number of matches required. Similarly, the initial response message 1540 comprises a minimum number of randomly selected portions of the original digital content element to be used, as well as a minimum number of matches required.

Any suitable number of randomly selected portions may be used, and any suitable number of minimum number of matches may be required. Suitable numbers of randomly selected portions include (but are not limited to): 1; 2; 3; 4; 8; 16; or 32. The minimum number of matches required for a match to be determined with a suitable level of accuracy may be expressed in any suitable fashion. Typically, it may be expressed as a percentage of the number of randomly selected portions, i.e., a certain percentage of the randomly selected portions must result in a match in order for it to be concluded that the first digital content element 1506 is found in the representation element 1544.

In essence, when the first digital content element comprises a plurality of randomly selected portions, the above-discussed method steps are repeated for each of the randomly selected portions. If a sufficient number of the randomly selected portions result in a match, it is concluded that the first digital content element 1506 is present in the representation element 1544.

In a ninth step 1409, the or each set of search results 1524 is matched with the first digital content element 1506. The matching step may be performed in any suitable fashion and using any suitable number of sub-steps. In some examples, the matching step comprises determining whether the digital content element is present in the set of search results.

Client Side Matching

Client side matching as provided by the method of the present invention can be configured in a number of ways and can determine whether a match to illegal material is made on a client device or a server device. Examples of both scenarios are set out below.

The following example is created where it is preferable for the client device to determine whether a match is made, not the server device.

Figure 16:
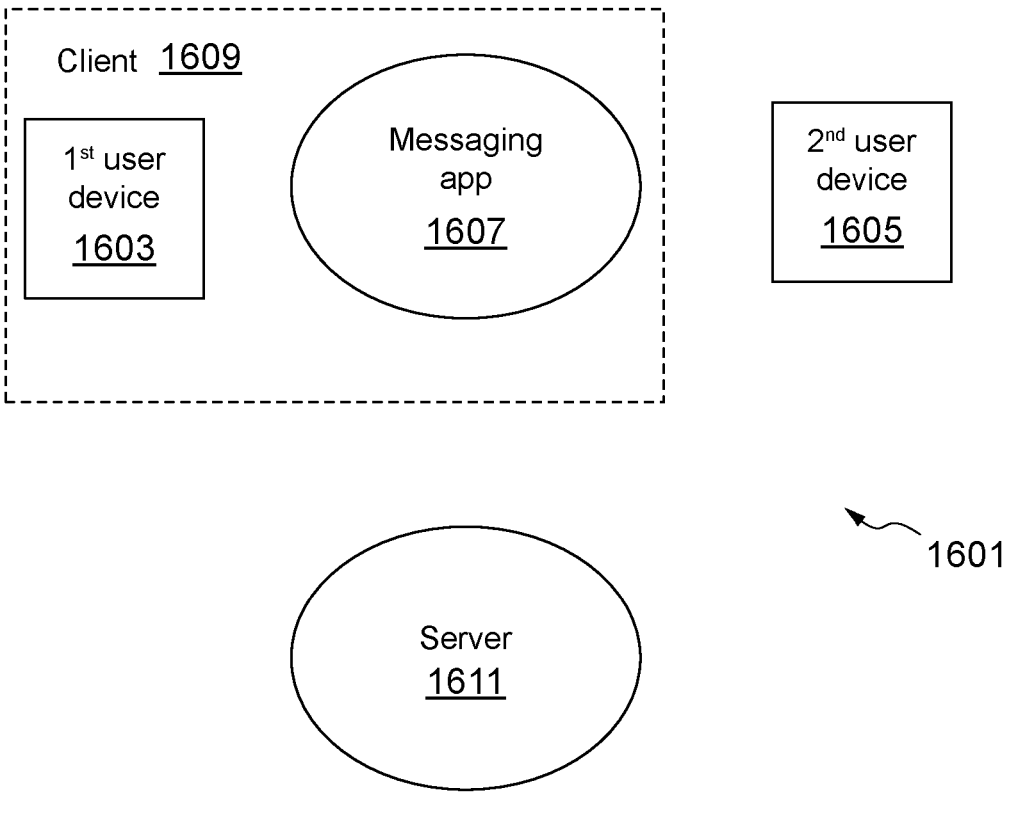
FIG. 16 and FIG. 17 illustrate a sixth embodiment of the present invention.
Figure 17:
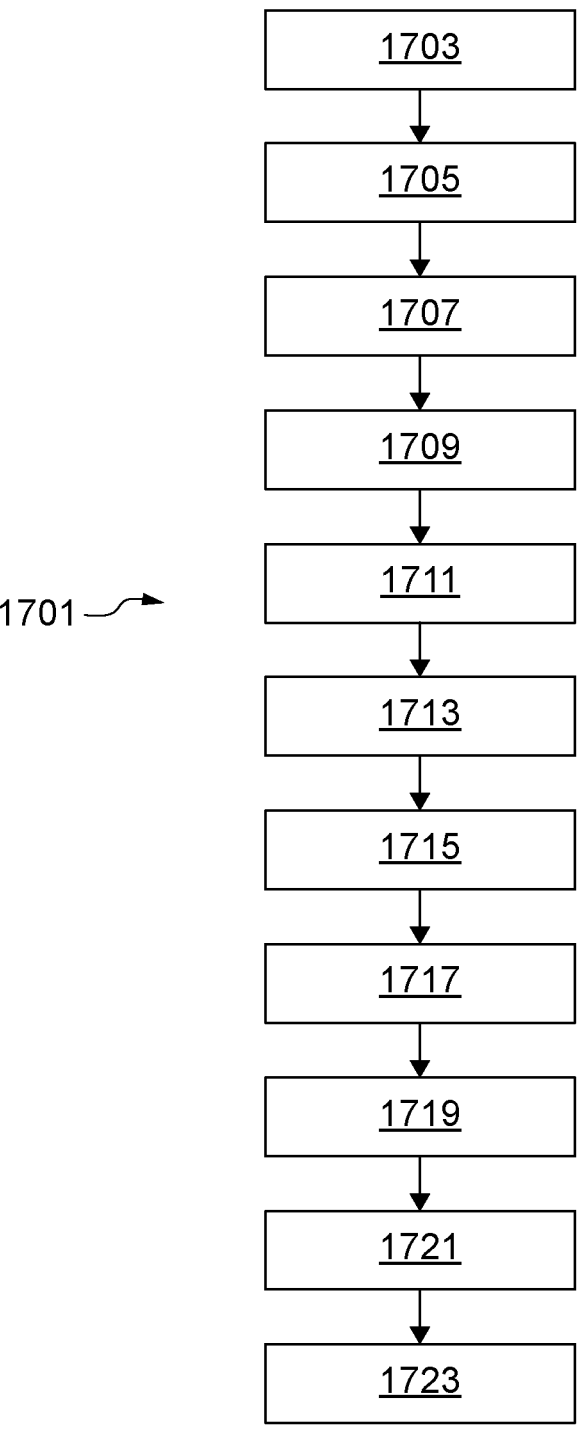

The example of FIGS. 16 and 17 relate to End-to-End Encryption using an MD5 message-digest algorithm derived Bloom filter where the client device determines whether a match is made.

As with previous examples, the following example is a method for submitting and receiving data relating to a first digital content element in which a search query is derived at the first entity (Client), it is transmitted to a second entity (server) where a set of search results based on the search query are derived then the search results are transmitted to the first entity (client) and the search results are matched with the first digital content element.

FIG. 16 is a schematic diagram 1601 which shows a client side 1609 which comprises a first user device 1603 and a messaging app 1607. A second user mobile device 1605 and a messaging App server 1611 are also shown. A first user is trying to send an image from their device, the first user device 1603 to the second user device 1605, which belongs to their friend. The message is to be sent via an end-to-end encrypted Messaging App 1607.

The "Client" 1609 is the combination of the first user device 1603 and messaging app 1607 including all the operating system software. The process described here takes place within the app.

The operator/owner of the Messaging App wishes to be able to check that images do not comprise illegal images, before sending them.

A Non-governmental organisation (NGO) "Server" has a hash database containing MD5s of known illegal images and has converted this hash database into a Bloom Filter, and the original MD5 hashes have 6 hash parts that need to be checked (each returning a positive result) in order to determine that a hash matches the bloom filter. The Bloom Filter is in this case 32 Gibibytes in size. This means it contains 235 bytes or 238 bits. Each lookup of the Bloom Filter (a single bit) therefore has a 38 bit address. The filter contains 20 million hashes.

FIG. 17 shows the process by which the image is checked to determine whether it contains illegal material.

The steps in the process are as follows:

1703 The client 1609 sends a request to the server 1611 to get the minimum number of bits it must ask for to guarantee there is at least one positive and one negative result in each possible addressable block, to determine the method of hashing used (and number of lookups for each hash). The results of this query may be cached by the client and reused, in which case this step may be omitted.

1705 The server 1611 returns the appropriate values, which may be cached or calculated from the bloom filter. In this case the answer sent by the server is MD5 hash extended by encrypting, 6 separate lookups in a 38 bit address space, and a minimum lookup size 4,096 bits (or 512 bytes) required for each lookup. The first two parameters are determined when the bloom filter was created. The minimum lookup size is determined by the content of the bloom filter—the server has calculated this such that at least 50% of queries contain at least one positive result.

1707 The client 1609 calculates the MD5 Hash of the file.

1709 The client 1609 extends the hash to 256 bits by encrypting the hash using the method specified by the server.

1711 The client 1609 breaks this extended hash in such a way as to extract 6 separate 38 bit addresses for lookup in the bloom filter.

1713 The client 1609 has been configured to ensure that a minimum privacy threshold is achieved so that any information which can possibly be extracted from the system refers to at least a million possible files (in our estimated $f=2^{100}$. In this case the parameters already determined are bn (bloom filter look ups) (6) and hl (hash length) (152), we know rl>=4096 bytes (the number of possible hashes) and we can choose larger values as well as determining rn. The values chosen are rl=32,768 and rn=12 (random lookups).

1715 The client 1609 subtracts a random number in the range 0-32,767 from each of the 6 lookup addresses. If any answer is negative, it is added to 238 to give a positive address.

1717 A further 6 random $2^{38}$ bit addresses are added to the list.

1719 The resulting 12 lookup addresses are sorted in ascending order and turned into queries for the server. A small number of LSBs may be discarded to allow e.g. a byte or word aligned block to be read as an optimisation with a corresponding small cost to privacy. In this case 3 LSBs are dropped to give a byte alignment (rounding either up or down to ensure the intended address remains in range).

1721 The server 1611 receives the request, and for each of the query addresses it returns the corresponding portion of the bloom filter at the requested block size (32,768 bits or 4 kb). For addresses closer than 32,768 bits to the end of the filter, additional bits will be returned from the start of the filter.

1723 The client 1609 receives the response from the server. Using the data only for the 6 valid addresses it retrieves the correct bit from each lookup range. If each of the 6 bits is a "1" it considers the file to be a match to the database and blocks transmission. It may also report the user to law enforcement for possession of illegal content, depending on relevant legislation.

In this and other examples, the method of the present invention has created a novel and technical solution to the problem of how to maintain user privacy and search for illegal content, for example: Each query returns 32,768 bits. Neither the server 1611 nor anyone intercepting traffic knows which of these bits corresponds to the file for which the query has been made.

6 lookups are used, which are arranged in ascending order for transmission meaning that the lookups could be put back together to form a whole hash in 6! or 720 different ways.

Each lookup is for 32,768 bits, so across 6 lookups that gives 327686 possible combinations of bits, multiplied by the 24 ways they could be sequenced giving $1.2 \times 10^{27}$ possibilities.

Range size has been selected based on information from the server that a range of 4096 bits guarantees at least 50% of possible query ranges contain at least 1 positive result doesn't numerically increase the uncertainty for a single hash, but dramatically increases computation required and uncertainty if attempting to compare information to track content.

By adding 6 random addresses to the lookup, there are 665,280 ways of creating a hash from 6 of these (compared with 720 without random additions). This increases the total combinations to $8.2 \times 10^{32}$ possible values ($\sim 2^{109}$).

The size of the request to the server is negligible (4 bytes per address) The size of the server response is 32,768, 192 bits/8*10=40 Kibibytes. For comparison a small image on a website might be a few tens or hundreds of kibibytes, so this is a small download, and the data transfer time will in practice be small compared with the latency on the request over most data networks.

If 20 million hashes are stored in this 32 Gb Bloom Filter (238 bits). For each hash, 6 bits are set. Some will collide reducing the total number in practice, but a good first approximation can ignore this and conclude 120 million bits are set=227 bits.

This means around 0.025% of bits in the Bloom Filter are set.

For a single random lookup of the Bloom Filter which should yield a negative result, the probability of getting a 1 through chance is 0.025%=1 in $4.4 \times 10^{-4}$ For 6 lookups the probability is $(4.4 \times 10^{-4})^6 = 6.9 \times 10^{-21}$. That means a bloom filter false positive will occur approximately once in every $1.4 \times 10^{20}$ lookups.

Given some social media platforms upload approximately 1011, this means if this technology were used for a social media platform with that level of uploads, at that rate, a false positive would occur once every $6.9 \times 10^{10}$ years, or once every 1,445 million years.

Acceptable false positive rates will depend on the consequences of a false positive. If the consequence is merely blocking transmission of a piece of content the impact on a user is substantially less than if a report is being made to authorities.

In another example, similar to the example described above with reference to FIGS. 16 and 17, the bloom filter on the server was assembled using block hashes rather than file hashes, which introduces an additional layer of protection against tracking content as it moves around the network, because which blocks are used for lookup can be randomised which means that queries relating to the same file may be for completely different blocks and therefore impossible to correlate.

In another example, similar to the example described above with reference to FIGS. 16 and 17.

At step 1705, the server additionally reports that to determine a file is a match, the client must sample 4 blocks and that at least 3 out of 4 must be matches. Steps 1709-1721 are repeated for each block, and only if 3 or more blocks or more are found to be matches to the database the app blocks transmission. It may also report the user to law enforcement for possession of illegal content, depending on relevant legislation.

The response from the server is larger again, this time ~1.2 Mb, although this is still small in terms of modern networks, however, the bloom filter is sparse in nature and compression can achieve 10:1 so the size of the block transferred over the network is reduced to 120 kb. Random block insertion could be added to achieve the same effect for small files (e.g. <10 blocks).

In another example, similar to the example described above with reference to FIGS. 16 and 17, however, instead of the "Client" being an end-to-end encrypted messaging app on a mobile phone, the "Client" could be a server application. For example, a secure photography storage service may wish to be able to check it is not hosting illegal content without violating its users privacy (by using a traditional approach such as sending images or hashes to a third party). By using this privacy protocol it can use an external service to make the necessary checks without having to hold the bloom filter data itself (for example where a data owner won't send them a copy for security or privacy reasons of its own).

Server Side Matching

As stated above, in some situations it may be preferable to have the result calculated on the server instead of the client. It may also be desirable for the client not to know the outcome so as not to alert an offender they have been detected (and to reduce the chances of offenders determining what content is known to the authorities).

Any solution using server matching involves the server being potentially in possession of both identifying information for the user (request will be associated with an IP address) and the outcome of the match (or at least a probability relating to match—see later). As a result, server matching solutions inherently require a higher degree of trust in the server component.

In addition, a server matching solution can be configured to allow the client to know the outcome of the match (e.g. to block content) by:

reporting the result of the match back to the device (with the downside that the result would be visible to anyone able to intercept the communication); or making the same response to the client as a client side matching solution would, allowing the client to determine separately whether a match was made.

In this case there is the potential for disagreement on the outcome between Client and Server as the Client has an added ability to reject false positives.

In the following example, a user is trying to send an image to a friend via an end-to-end encrypted messaging app on their phone. The "Client" in this context is the combination of their mobile device and app (and all the operating system software etc). In this example, the process described here takes place within the app.

The designer of the app wishes to be able to check that images are not known to be illegal before sending them. The designer also wishes to be able to report the illegal material to a third entity such as a National Police Organisation.

Figure 18:
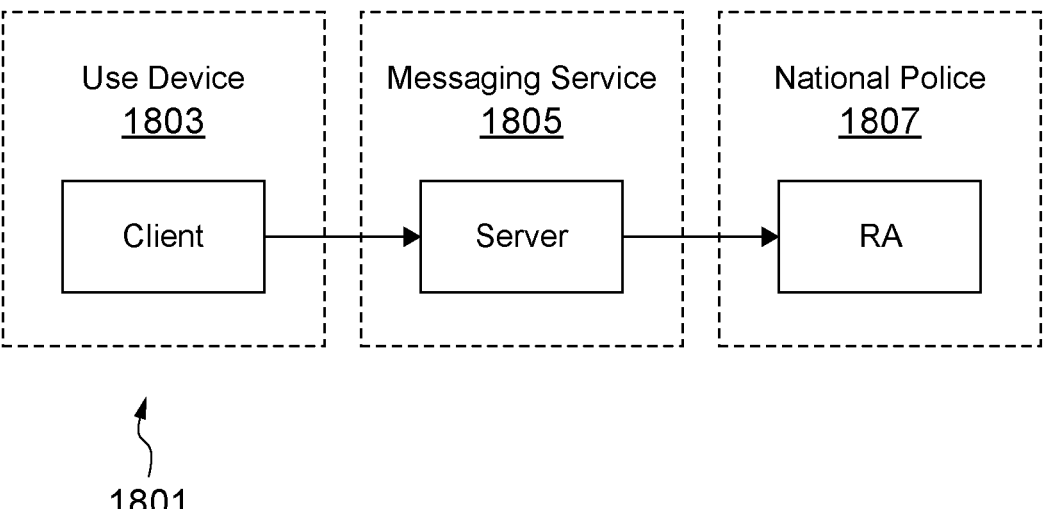
FIG. 18 and FIG. 19 illustrate a seventh embodiment of the present invention.
Figure 19:
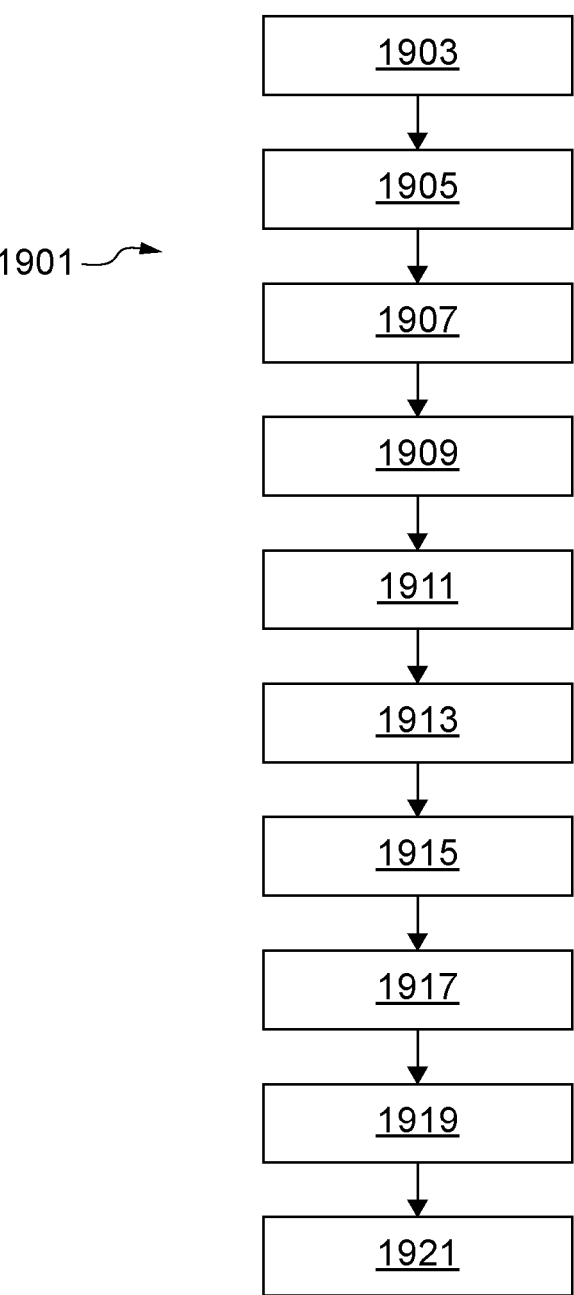

FIG. 18 is a schematic diagram 1801 which shows a first user mobile device 1803, a messaging App server 1805 and a national police database 1807. FIG. 19 is a flow chart 1901 which shows the process by which the image is checked to determine whether it contains illegal material.

In this example, the NGO has made available a hash database containing MD5s of known illegal material converted to a bloom filter which is used on a server hosted by the messaging company. In this Bloom Filter the original MD5 hashes have been extended such that 8 hash parts need to be checked (each returning a positive result) in order to determine that a hash matches the bloom filter. The Bloom Filter is in this case 32 Gibibytes in size. This means it contains 235 bytes or 238 bits. Each lookup of the Bloom Filter (a single bit) therefore has a 38 bit address. The filter contains 20 million hashes.

The steps in the process as shown in FIG. 19 are as follows:

1903 The client sends a request to the server to get the minimum number of bits it must ask for, to determine the method of hashing used and number of lookups for each hash. The results of this query may be cached by the client and reused; in which case this step may be omitted.

1905 The server returns the appropriate values, which may be cached or calculated from the bloom filter. In this case the answer sent by the server is MD5 hash extended by encrypting, 8 separate lookups in a 38 bit address space, and a minimum lookup size 64 bits (or 8 bytes) required for each lookup. The first two parameters are determined when the bloom filter was created. The minimum lookup size is determined by the content of the bloom filter. The server has calculated this to deliver an acceptably low false positive rate for the application.

1907 The client calculates the MD5 Hash of the file.

1909 The client the hash to 512 bits by encrypting the hash using the method specified by the server.

1911 The client breaks this extended hash in such a way as to extract 8 38 bit addresses for lookup in the bloom filter.

1913 The client subtracts a random number in the range 0-63 from each of the 8 lookup addresses. If any answer is negative, it is added to $2^{38}$ to give a positive address 1915 The resulting lookup addresses are sorted in ascending order and sent in a query to the server.

1917 The server receives the request, and for each query it identifies the corresponding 8 bit block in the bloom filter.

1919 If ANY 8-bit block contains only zeroes processing stops at this point

1921 If each 8-bit block contains at least one "1" then the report is forwarded to the police.

In this and other examples, the method of the present invention has created a novel and technical solution to the problem of how to maintain user privacy and search for illegal content, for example:

each query references 64 bits, therefore, neither the server nor anyone intercepting traffic knows which of these bits corresponds to the file for which the query has been made;

8 lookups are used, which are arranged in ascending order for transmission meaning that the lookups could be put back together to form a whole hash in 8! or 40,320 different ways;

each lookup is for 64 bits, so across 8 lookups that gives $64^8$ possible combinations of bits, multiplied by the 40,320 ways they could be sequenced giving $1.1 \times 10^{19}$ possibilities ($2^{63}$);

range Offset Randomisation increases computation required and uncertainty if attempting to compare information to track content.

In this example the Server will have a very high probability indication that the content has matched (and is thus illegal) and this could in principle be associated with the IP address originating the request (unless measures were taken to isolate this information) so the server is handling sensitive information which could be accessible to an insider threat/bad actor who could penetrate the server. However, that actor would only be able to identify IP addresses associated with illegal material, no other user information would be available to them.

20 million hashes are stored in this 32 Gb Bloom Filter (238 bits). For each hash, 8 bits are set. Some will collide reducing the total number in practice, but a good first approximation can ignore this and conclude 160 million bits are set=228 bits. This means around 0.058% of bits in the Bloom Filter are set.

For a single random lookup of the Bloom Filter which should yield a negative result, the probability of getting a 1 through chance is 0.058%=1 in $1 \times 10^{-3}$ For 8 lookups the probability is 1 in $(0.00058)^8 = 8 * 10^{-25}$. That means a bloom filter false positive will occur approximately once in every 1024 lookups. However, our lookups are blocks of 64 bits—the probability of at least one "1" randomly occurring in an 8 bit block is $1-(1-0.00058)8$ which is 0.032 For 8 lookups of 8 bits the probability of randomly getting at least one "1" in each block is 1 in $(0.032)^8 = 3.2 \times 10^{-12}$. That means a bloom filter false positive will occur approximately once in every $3 \times 10^{11}$ lookups. Social media companies may upload approximately $10^{11}$ files per year, therefore, if this technology were used for uploads a false positive would occur about 3 times a year.

In the above and other server side matching examples in accordance with the present invention, a number of outcomes are envisaged such as the following examples:

1. Making or passing a report to a third entity, where that third entity may be a law enforcement organisation or other entity with an interest in receiving information concerning matching content;

2. Accumulating a risk score for the user or group sending or receiving the message;

3. Blocking the user from the platform; and

4. Returning information to the first entity which results in one or more actions including but not limited to,
   a. Transmission of the content being blocked
   b. Triggering a report to a moderation team
   c. Displaying a warning message or prompt to the user
   d. Making or passing a report to a third entity, where that third entity may be a law enforcement organisation or other entity with an interest in receiving information concerning matching content.

Various embodiments are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory, computer-readable medium may include an electronic, magnetic, optical, electromagnetic, or semiconductor data storage system, apparatus or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM) or a portable digital versatile/video disc read-only memory (DVD/Blu-ray).

The computer program instructions may also be loaded onto a computer and/or other programmable data processing apparatus to cause a series of operational steps to be performed on the computer and/or other programmable data processing apparatus to cause a series of operational steps to be performed on the computer an/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code etc.) that runs on a processor, which may collectively be referred to as "circuitry", "a module" or variants thereof.

It should also be noted that in some alternate implementations, the functions/acts noted in the blocks may occur out of the order noted in the flowcharts. For examples, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. A method for submitting and receiving data relating to a first digital content element, comprising:
   deriving a search query at a first entity, the search query comprising at least a portion of a first digital content element, wherein a first number of possible search results in a set of search results is determined, and wherein the search query is derived based on the first number of possible search results in the set of search results;
   transmitting the search query to a second entity, the second entity comprising a content database, the content database comprising a plurality of digital content elements;
   deriving a set of search results based on the search query, the set of search results comprising any digital content elements of the content database matching the search query;
   transmitting the set of search results to the first entity; and
   matching the set of search results with the first digital content element.

2. A method according to claim 1, wherein the first digital content element comprises a representation of at least a portion of an original digital content element.

3. A method according to claim 2, wherein the first digital content element comprises a plurality of representations of portions of the original digital content element.

4. A method according to claim 2, wherein the first digital content element comprises one of: a hash; or similarity hash.

5. A method as claimed in claim 4 wherein further processing is applied to the hash or similarity hash.

6. A method as claimed in claim 5 wherein further processing comprises further hashing or encryption.

7. A method according to claim 1, wherein the step of deriving a search query comprises:
   selecting at least a first portion of the first digital content element; and
   establishing the search query based on the selected first portion.

8. A method according to claim 7, comprising:
   selecting a plurality of first portions of the first digital content element; and
   establishing the search query based on at least one of the selected first portions.

9. A method according to claim 7, wherein the step of deriving a search query further comprises:
   determining a total number of sub-elements comprised in the first digital content element.

10. A method according to claim 7, wherein the step of selecting at least a first portion of the first digital content element comprises:

deriving at least one set of representation units from at least a first portion of the first digital content element, wherein the at least one set of representation units comprises one or more representation units; and selecting at least one of the one or more sets of representation units.

11. A method according to claim 10, wherein the at least first portion comprises at least one sub-element of the first digital content element.

12. A method according to claim 11, wherein the at least first portion comprises a plurality of sub-elements of the first digital content element.

13. A method according to claim 11, wherein the at least one sub-element is a block.

14. A method according to claim 10, wherein the step of deriving at least one set of representation units comprises deriving a plurality of sets of representation units from the at least one first portion of the first digital content element.

15. A method according to claim 10, wherein the step of deriving at least one set of representation units comprises subtracting a randomised value from each of the at least one set of representation units.

16. A method according to claim 10, further comprising dividing the first digital content element into a plurality of sub-elements, each of which comprises one or more information units.

17. A method according to claim 10, wherein the step of deriving at least one set of representation units comprises deriving at least one most significant bit from the at least one first portion.

18. A method according to claim 17, wherein the step of deriving at least one set of representation units comprises deriving a plurality of most significant bits from the at least one first portion.

19. A method according to claim 7, wherein the step of establishing the search query further comprises:

generating at least one additional sets of randomised representation units; and including the at least one additional sets of randomised representation units in the search query.

20. A method according to claim 1, further comprising, creating a first digital content element based on at least a portion of an original digital content element.

21. A method according to claim 20, wherein the step of creating a first digital content element comprises:

transmitting an initial request message from the first entity to the second entity, the initial request message comprising a request for at least a first required characteristic;

receiving an initial response message from the second entity at the first entity, the initial response message comprising at least a first required characteristic; and generating the first digital content element based on the at least first required characteristic.

22. A method according to claim 21, wherein the at least first required characteristic comprises one or more of: a minimum size for each of the at least one sets of representation units to guarantee that any set of representation units comprised in the search query will result in at least one positive and one negative result; a required hashing or representation methodology to be used for the search query; or a number of sets of representation units required.

23. A method for submitting and receiving data relating to a first digital content element, comprising:

deriving a search query at a first entity, the search query comprising at least a portion of a first digital content element, wherein a first number of possible search results in a set of search results is determined, and wherein the search query is derived based on the first number of possible search results in the set of search results;

transmitting the search query to a second entity, the second entity comprising a content database, the content database comprising a plurality of digital content elements;

deriving a set of search results based on the search query, the set of search results comprising any digital content elements of the content database matching the search query;

wherein the second entity matches the set of search results with the first digital content element; and upon detecting matching content, the second entity takes one or more actions in response.

24. The method as claimed in claim 23 wherein the action in response comprises:

reporting the match to a third entity, where the third entity may be a law enforcement organisation or other entity with an interest in receiving information concerning matching content.

25. The method as claimed in claim 23 wherein the action in response comprises accumulating a risk score for a user or a group associated with sending or receiving a message containing the matching content.

26. The method as claimed in claim 23, wherein the action in response comprises blocking the user from the platform wherein the user is associated with sending or receiving a message containing the matching content.

27. The method as claimed in claim 23, wherein the action in response comprises returning information to the first entity which results in one or more actions including transmission of the content being blocked, triggering a report to a moderation team, displaying a warning message or prompt to the user.

\* \* \* \* \*